United States Patent
Le Leannec et al.

(10) Patent No.: US 7,190,838 B2
(45) Date of Patent: Mar. 13, 2007

(54) METHOD AND DEVICE FOR PROCESSING A CODED DIGITAL SIGNAL

(75) Inventors: Fabrice Le Leannec, Sevigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1052 days.

(21) Appl. No.: 10/167,663

(22) Filed: Jun. 13, 2002

(65) Prior Publication Data
US 2002/0191852 A1 Dec. 19, 2002

(30) Foreign Application Priority Data
Jun. 13, 2001 (FR) .................................. 01 07750

(51) Int. Cl.
*G06K 9/00* (2006.01)
(52) U.S. Cl. .................................................. 382/233
(58) Field of Classification Search ........ 382/232–253, 382/305, 173; 358/453, 426.01–426.16; 375/240–240.27; 348/420.1–422.1, 572, 348/792
See application file for complete search history.

(56) References Cited

U.S. PATENT DOCUMENTS

| | | | |
|---|---|---|---|
| 6,501,860 B1 * | 12/2002 | Charrier et al. ............. | 382/240 |
| 6,535,644 B1 * | 3/2003 | Kurapati ..................... | 382/240 |
| 6,711,297 B1 * | 3/2004 | Chang et al. ............... | 382/240 |
| 6,747,762 B1 * | 6/2004 | Josephsen et al. .......... | 358/453 |
| 7,088,858 B2 * | 8/2006 | Henry ........................ | 382/173 |
| 2002/0048319 A1 | 4/2002 | Onno | |

FOREIGN PATENT DOCUMENTS

WO    WO 9949412    9/1999

OTHER PUBLICATIONS

Sachin Deshpande, et al., "HTTP Streaming Of JPEG 2000 Images", Proceedings International Conference On Information Technology: Coding and Computing, Las Vegas, NV, USA, pp. 15-19, XP002193324, IEEE Comput. Soc, 2001.
Chiang S. Jao, et al., "The Display of Photographic-Quality Images on The Web: A Comparison of Two Techniques", IEEE Transactions on Information Technology in Biomedicine, vol. 3, No. 1, pp. 70-73, Mar. 1999.

* cited by examiner

Primary Examiner—Ishrat Sherali
(74) Attorney, Agent, or Firm—Fitzpatrick, Cella, Harper & Scinto

(57) ABSTRACT

A method of processing a coded digital signal including a set of information representing the digital signal, zones of the signal, and parameters used during the coding. The method includes, after reception of a request to obtain a selected part of the coded digital signal, the steps of locating the selected part in the digital signal from the set of information, determining internal zones contained entirely in the selected part of the digital signal from the set of information, decoding the internal zones, and retrieving the zones.

40 Claims, 13 Drawing Sheets

METHOD AND DEVICE FOR PROCESSING A CODED DIGITAL SIGNAL

Figure 1:
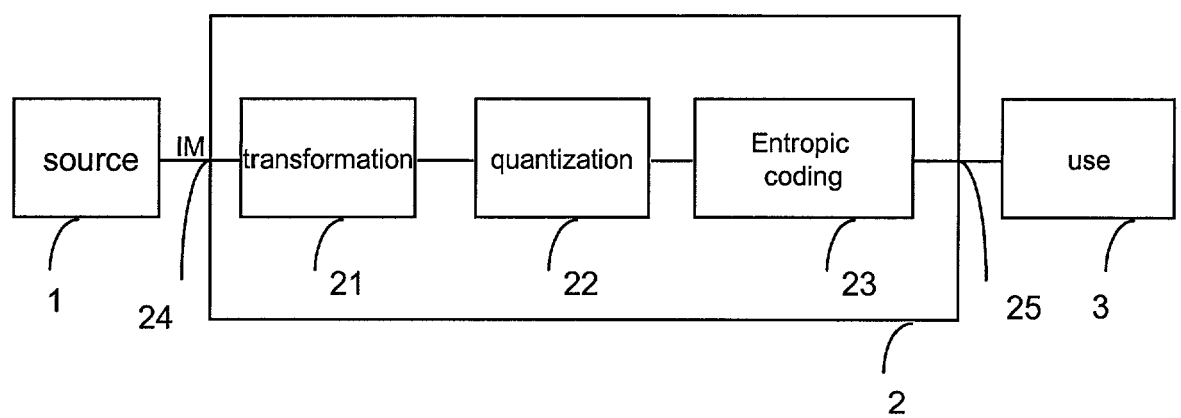

The present invention concerns a method of processing a coded digital signal from a digital signal separated into several zones, the said coded digital signal containing a set of information representing the digital signal, the zones of the said signal, and parameters used during the coding of this signal.

The invention applies notably in the field of image processing.

In the context of Part 1, entitled "JPEG 2000 Image Coding System", of the standard JPEG 2000, the structure of the internal data is such that a user can have access to part of a coded image, referred to as a sub-image, without having to decode all the image.

This is advantageous since the user obtains the sub-image which he requires more rapidly than if he had to decode the entire image.

A method is known which provides for a prior processing for performing the above function. An image format called "flashpix" is used, which contains a series of images in accordance with the JPEG standard and of fixed size 64×64. In order to obtain a part of the image or sub-image in the flashpix format, the method consists of decoding the different small images of size 64×64 in order to obtain the sub-image.

Decoding a sub-image is made possible because of the structure of the data or samples constituting the coded image and which are organized in blocks, each block constituting a basic unit for the coding of the image.

Because of this, it is possible to access the sub-image selected by the user more rapidly by extracting and decoding only the basic blocks corresponding to this sub-image.

To do this, first of all the sub-image is projected in the different frequency sub-bands which are obtained by decomposition of the image into frequency sub-bands according to one or more decomposition levels. Next the basic blocks in which the sub-image is found are identified, in the different sub-bands, and are decoded in order to reconstruct the sub-image.

More precisely, in Part 1 of JPEG 2000 mentioned above, provision is made for the image to be separated into several zones, referred to as tiles, which each undergo a decomposition into frequency sub-bands which is independent from one tile to another.

These tiles each consist of a plurality of blocks in the different sub-bands.

The processing of an image therefore takes place tile by tile and, within each tile, block by block.

As explained above, following a request from a user in order to obtain the display of a sub-image selected in a coded image, having to decode only the basic blocks corresponding to this sub-image makes it possible to display the sub-image rapidly.

However, when the image is separated into zones or tiles, the processing effected tile by tile, and then block by block within a tile in question, may take a little more time than if only blocks were dealt with.

The applicant perceived that it would be advantageous to be able to increase still further the speed of response to the request from a user aimed at obtaining the display of the sub-image which he has selected.

The Applicant found that this problem could be extended to the case of a coded digital signal which is not necessarily a coded image.

Such a digital signal may for example be a sound signal, part of which will be retrieved according to a request from a user.

The object of the present invention is thus a method of processing a coded digital signal from a digital signal separated into several zones, the said coded digital signal containing a set of information representing the digital signal, the zones of the said signal, and parameters used during the coding, characterized in that the said method includes, after reception of a request for obtaining a selected part of the coded digital signal, the following steps:

locating said selected part in the digital signal from the set of information, determining the so-called internal zones contained entirely in the selected part of the digital signal from the set of information, decoding these internal zones, and retrieving these zones.

Correlatively, the invention relates to a device for processing a coded digital signal containing a set of information representing the digital signal, the zones of the said signal, as well as parameters used during the coding, characterized in that the said device has:

means of receiving a request for obtaining a selected part of the coded digital signal, means of locating said selected part in the digital signal from the set of information, means of determining the so-called internal zones contained entirely in the selected part of digital signal from the set of information, means of decoding these internal zones, and means of retrieving these zones.

Thus the present invention makes it possible to respond quickly to the request of a user by being concerned initially with the internal zones contained entirely in the selected part of the signal and retrieving solely these zones.

Advantageously, the retrieval of these zones is rapid since it does not require any specific processing except their decoding.

This makes it possible to avoid the user having to wait until all his request is processed.

More particularly, the coded digital signal including, on the one hand, a set of information representing the digital signal, the zones of said signal representing spatial information, as well as parameters used during the coding, and on the other hand the coded zones of said signal, the determination step applies to the zones representing spatial information and the decoding step applies to the coded zones of said signal.

According to one characteristic, the method includes a step of determining so-called partial zones of the signal which are partially contained in the selected part of said signal and determining so-called internal portions of these zones which are disposed inside said selected part of the signal.

Thus, after the processing of the so-called full zones, and their retrieval, the concern is with the processing of the zones which are partially contained in the selected part of the signal.

According to another characteristic, the method includes a step of deciding, according to at least one predetermined criterion, with regard to an increase in the size of each internal portion of a partial zone to be taken into account with a view to any subsequent retrieval.

Such an increase in size is referred to as a preliminary spatial extension.

There is for example taken as a predetermined criterion the memory capacity available to the user or the speed with which the user wishes to obtain a response or else any transmission cost for additional data, or the calculation power of the user equipment.

According to yet another characteristic, in the event of a preliminary spatial extension decision resulting in a so-called spatially extended portion, the said method includes a step of deciding, according to at least one predetermined criterion, with regard to the magnitude of the preliminary spatial extension of the partial zone internal portion to be taken into account with a view to any subsequent retrieval.

For example, the predetermined criterion can here also correspond to the memory capacity available to the user and, if this proves sufficient, it may be decided to spatially extend the partial zone internal portion, so as to take into account all this partial zone.

If on the other hand the memory capacity is not sufficient, then the spatially extended portion will represent only a fraction of the partial zone.

According to one characteristic, the coded digital signal including a set of samples of different types obtained by coding a set of original samples representing physical quantities, said method includes the following steps:
- obtaining a number of samples of at least one predetermined type which are contained in each spatially extended portion of a partial zone,
- deciding with regard to a modification of the size of the spatially extended portion in question according to the number of samples obtained.

A spatially extended portion of a partial zone may therefore itself be subjected to a modification of its size for the purpose of retrieving an extended portion of acceptable quality for the user.

Thus, for example, with a view to obtaining an acceptable image signal retrieval quality, the method includes a step of increasing the size of the spatially extended portion.

This then results in a spatially extended and prolonged portion.

If, on the other hand, the quality of the spatially extended portion is already acceptable in itself, the size of this portion is preserved.

According to one characteristic, the method according to the invention includes a step of decoding the portions spatially extended having or not a modified size.

According to another characteristic, the method according to the invention includes a step of storing the portions spatially extended having or not a modified size and decoded.

Thus only the spatially extended portions which will be taken into account for any subsequent retrieval are stored.

According to one characteristic, the method according to the invention includes a step of retrieving the internal portions of the partial zones adjacent to the internal zones already retrieved.

With this retrieval, a response is given to the entire request made by the user on the selected part of the coded digital signal.

When it has been decided to spatially extend the internal portions of the partial zones, the spatially extended portions have been stored as stated above, and the method according to the invention also includes a step of providing at least one interactive mechanism. This interactive mechanism makes it possible, when it is activated, to retrieve all or some of the spatially extended portions.

Thus the method according to the invention makes it possible to respond to the entire request of the user by retrieving the internal zones and the internal portions of the partial zones which are adjacent to them, and by providing at least one interactive mechanism. This mechanism will make it possible, when it is activated, to retrieve additional data in the vicinity of the selected part of the digital signal, without having to make a new request.

Although it has been possible to carry out an increase in size of the spatially extended portions, the additional data which can be retrieved concern only some or all of the spatially extended portions.

This is because, in this case, the increase in size of the spatially extended portions has made it possible to improve the quality of retrieval of these spatially extended portions by taking into account more data than those contained only in the spatially extended portions.

The spatially extended and prolonged portions have therefore been decoded, without however storing them.

Thus the activation of this interactive mechanism makes it possible to retrieve all or some of the spatially extended portions at the improved quality.

It can also be envisaged that no increase in size has been carried out on these spatially extended portions and that only these spatially extended portions have been decoded and then stored before any retrieval thereof.

When it has been decided not to spatially extend the internal portion of the partial zones to be taken into account with a view to any subsequent retrieval, the coded digital signal including a set of samples of different types obtained by coding a set of original samples representing physical quantities, said method includes the following steps:
- obtaining a number of samples of at least one predetermined type which are contained in each partial zone internal portion,
- deciding with regard to a modification of the size of the internal portion in question according to the number of samples obtained.

Thus, even in the case of a decision against preliminary spatial extension of the internal portion of partial zones in question, it is possible to decide, with a view to retrieving an internal portion of acceptable quality for the user, to modify or not the size of this internal portion according to the number of samples obtained.

For example, it may be decided to increase the size of the internal portion of the partial zone concerned by adding to it a fraction of a so-called external portion of the partial zone in question and which is disposed outside the selected part of the signal, thus resulting in a partial zone extended internal portion.

In the case of obtaining internal portions, extended or not, they are decoded and only the internal portions are retrieved.

According to another aspect, the invention also relates to:
- an information storage means which can be read by a computer or a microprocessor storing instructions of a computer program for implementing the processing method according to the invention such as the one briefly disclosed above, and
- an information storage means which is removable, partially or totally, and which can be read by a computer or microprocessor storing instructions of a computer program for implementing the processing method according to the invention such as the one briefly disclosed above.

According to yet another aspect, the invention relates to a computer program which can be directly loaded into a programmable device, containing instructions or portions of code for implementing the steps of the processing method of the invention as briefly disclosed above, when said computer program is executed on a programmable device.

The characteristics and advantages relating to the device for processing a coded digital signal, to the information storage means and to the computer program being the same as those disclosed above concerning the processing method according to the invention, they will not be repeated here.

Figure 2:
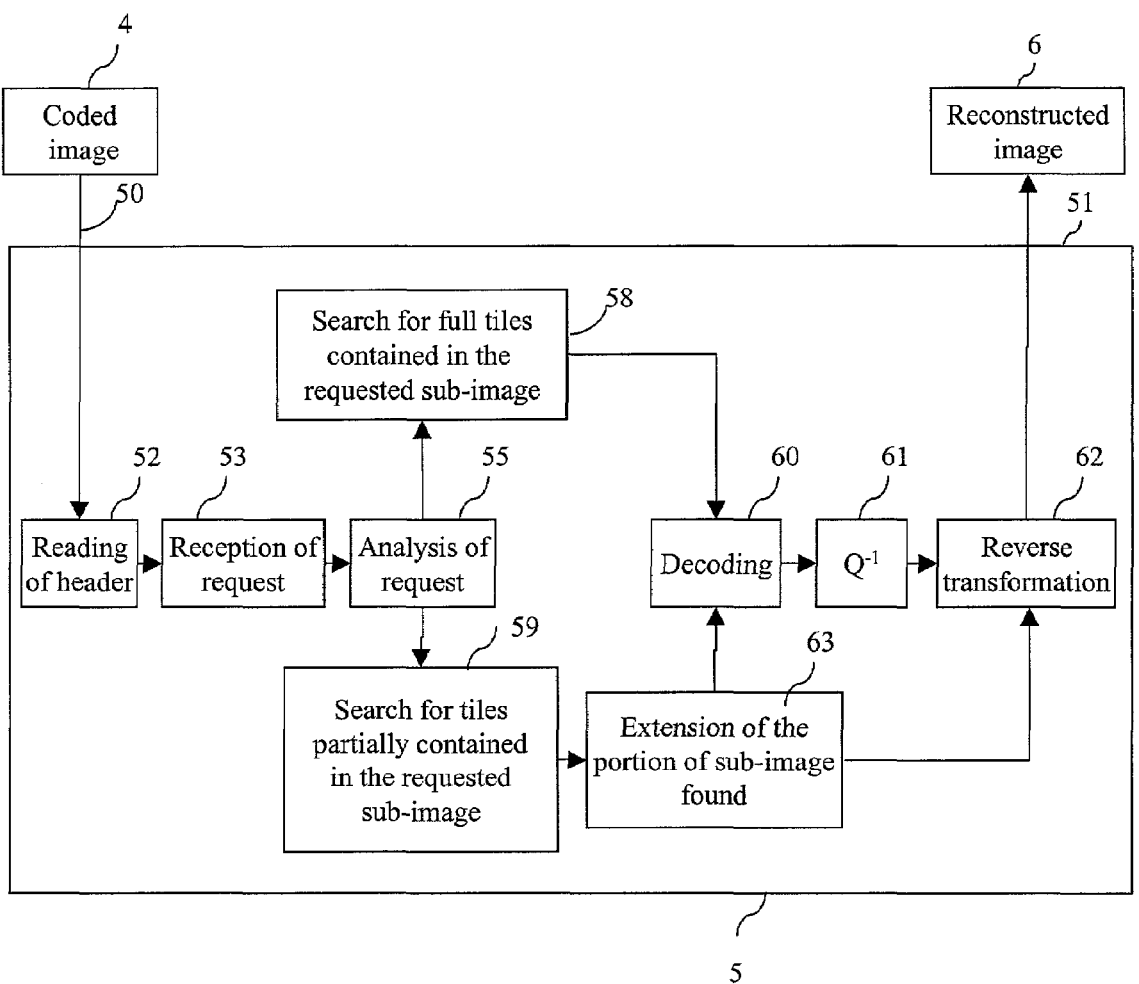
Figure 3:
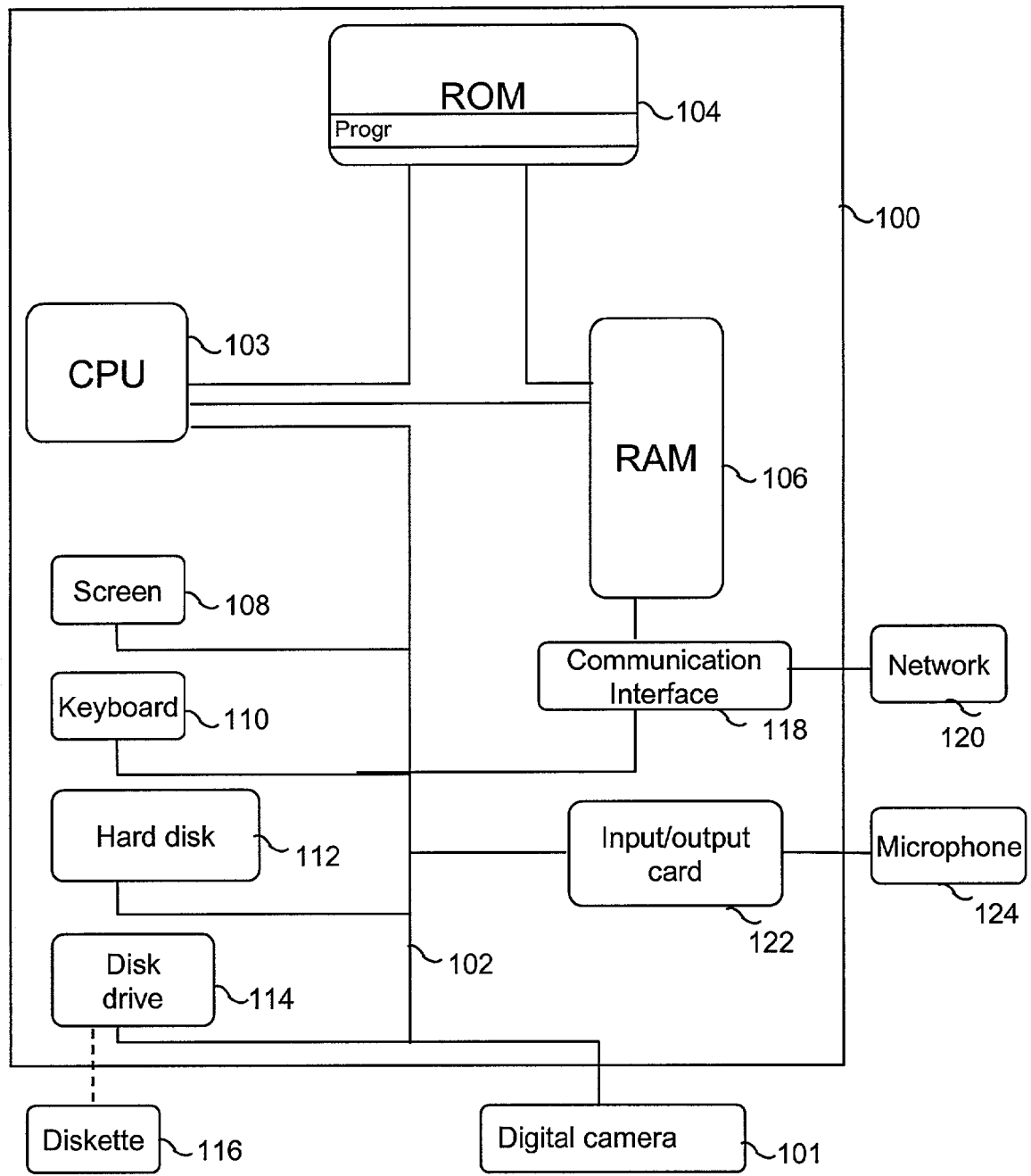
Figure 4A:
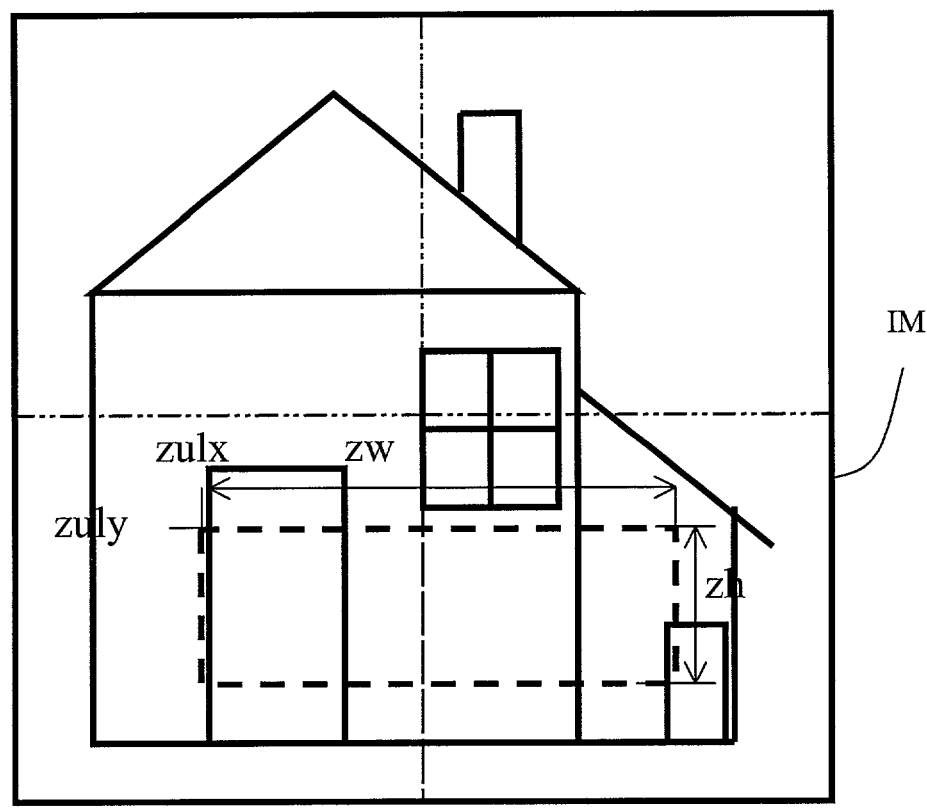
Figure 4B:
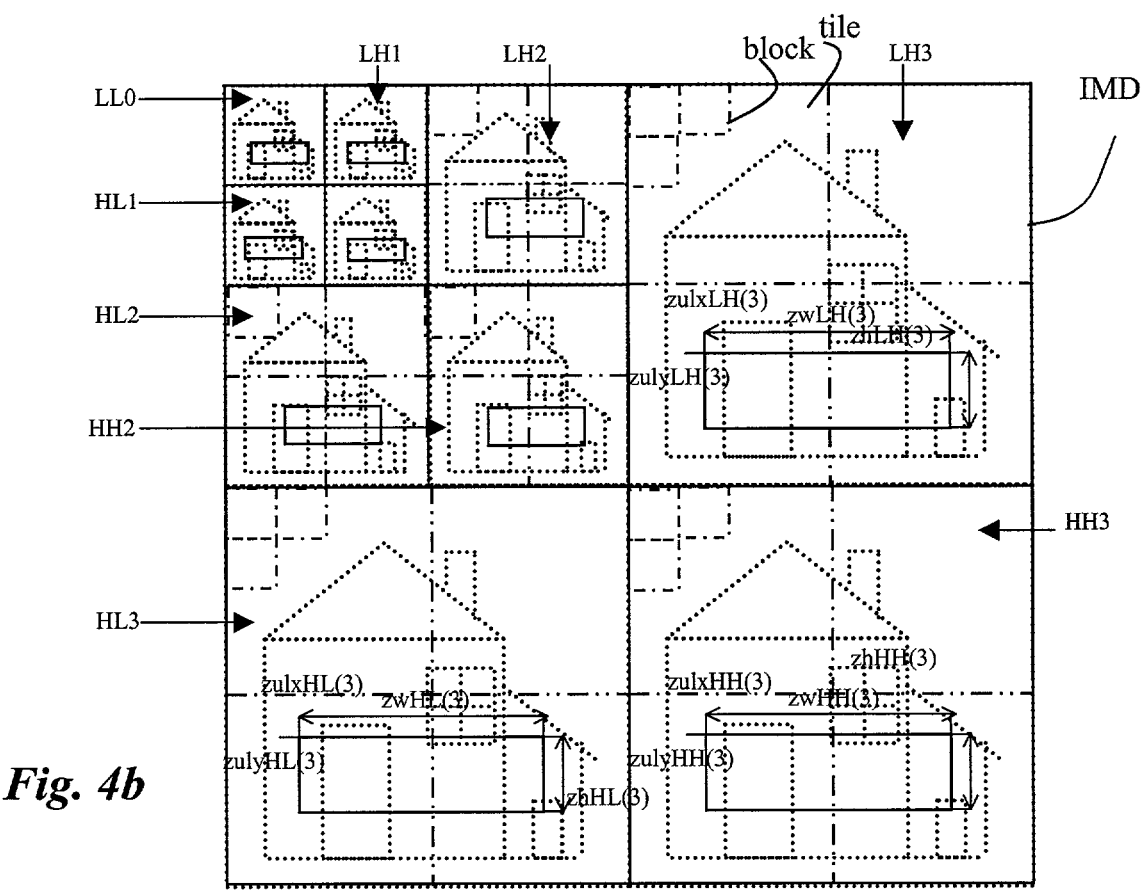
Figure 5:
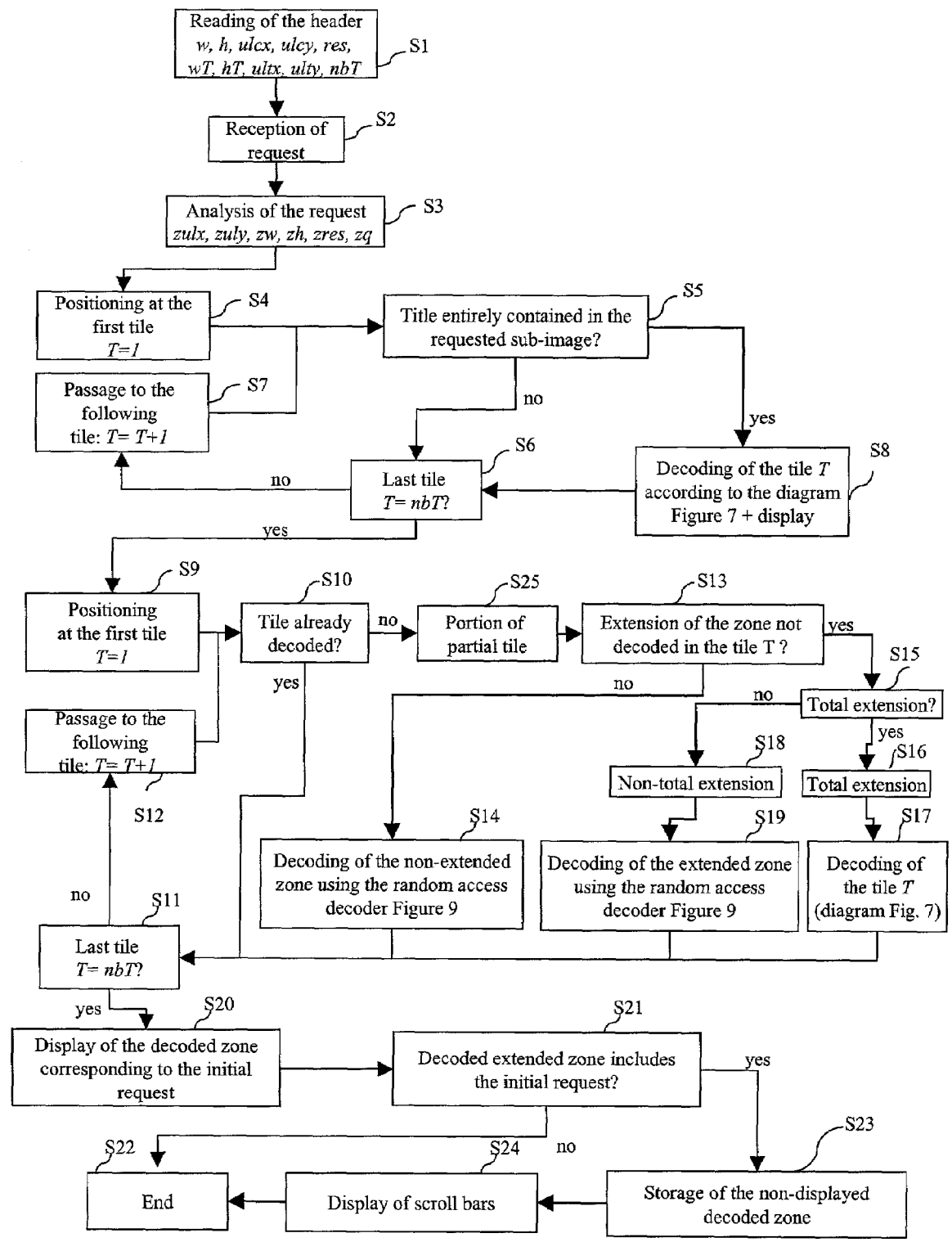
Figure 6:
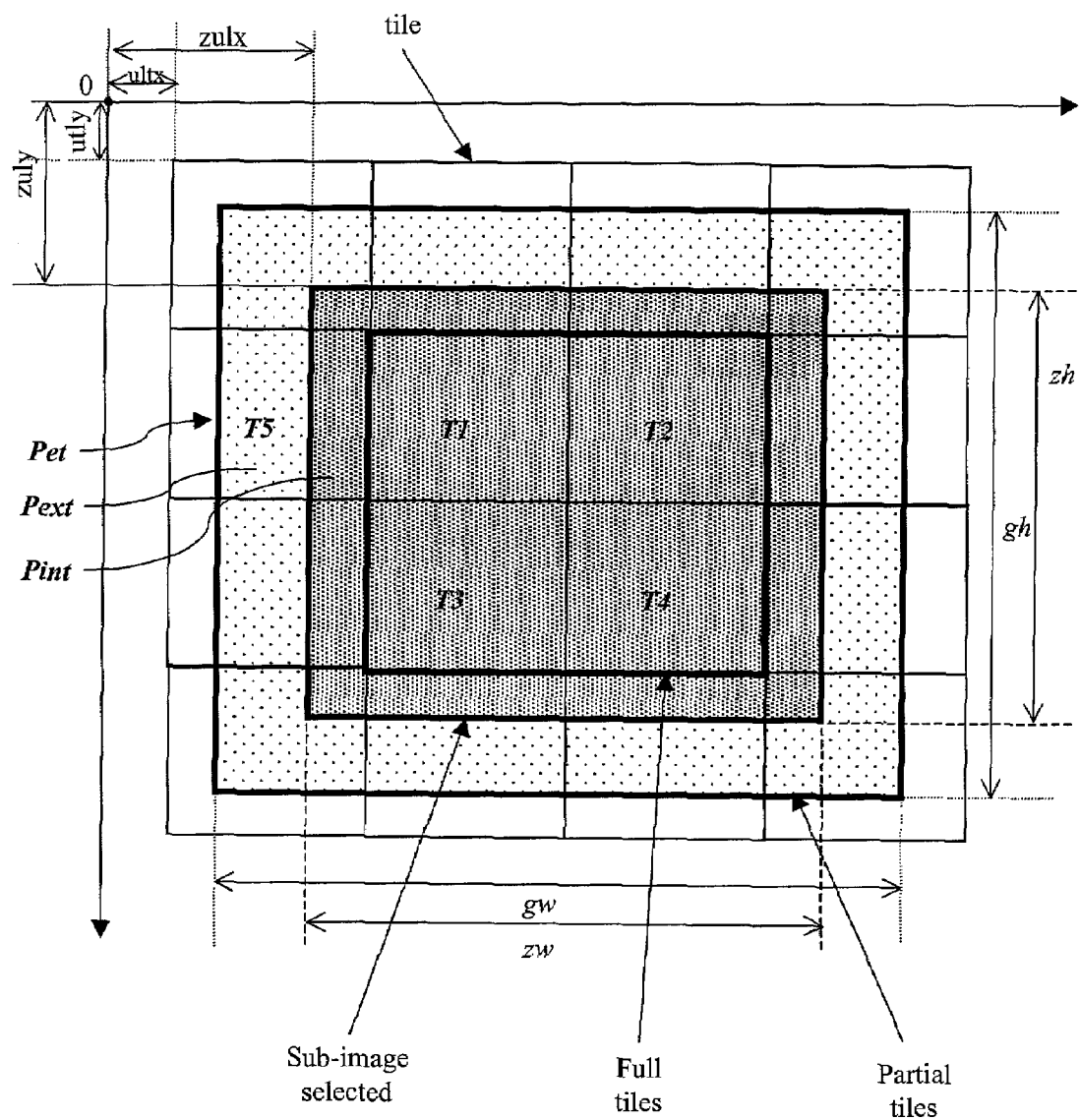
Figure 7:
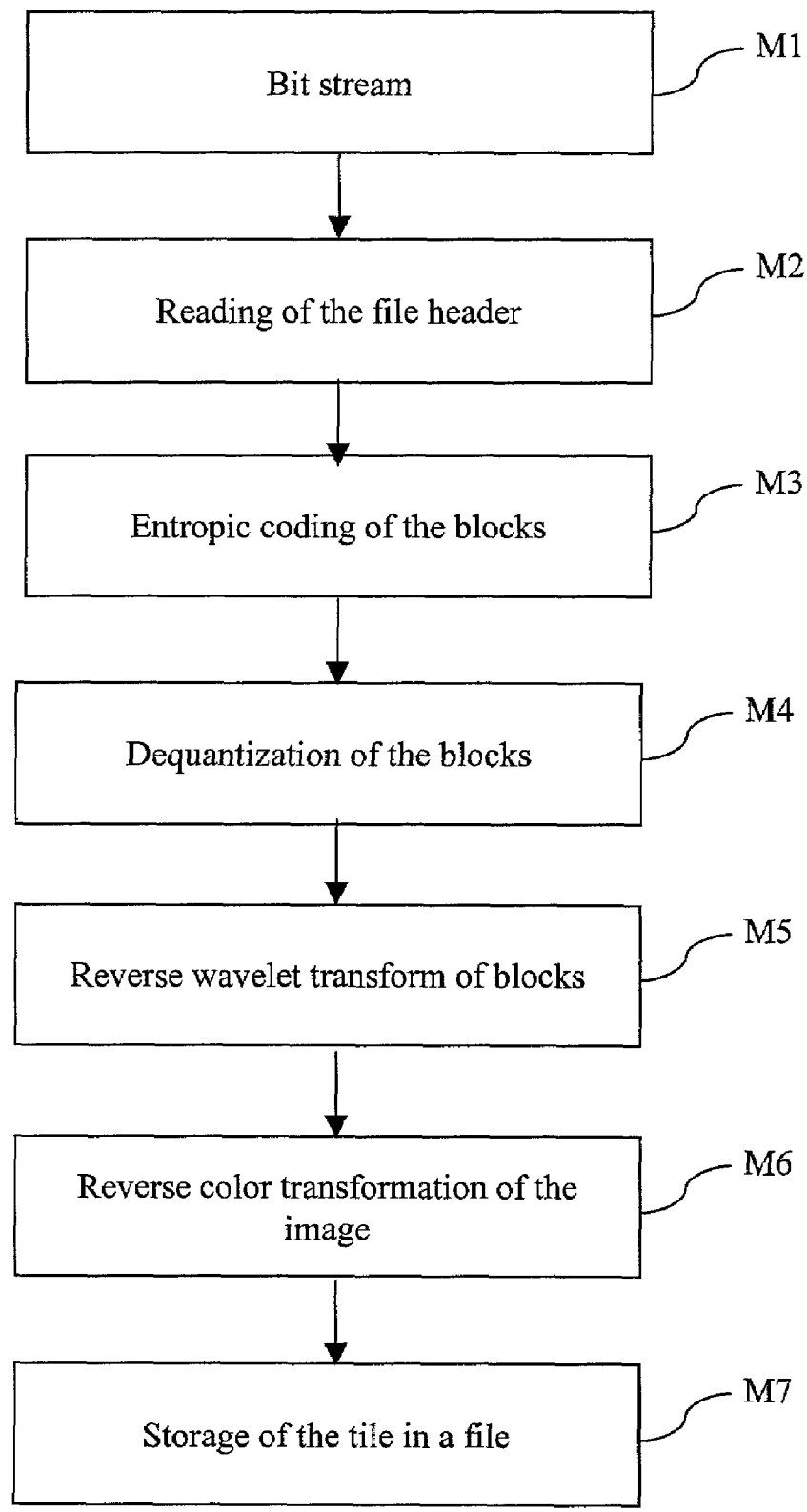
Figure 8A:
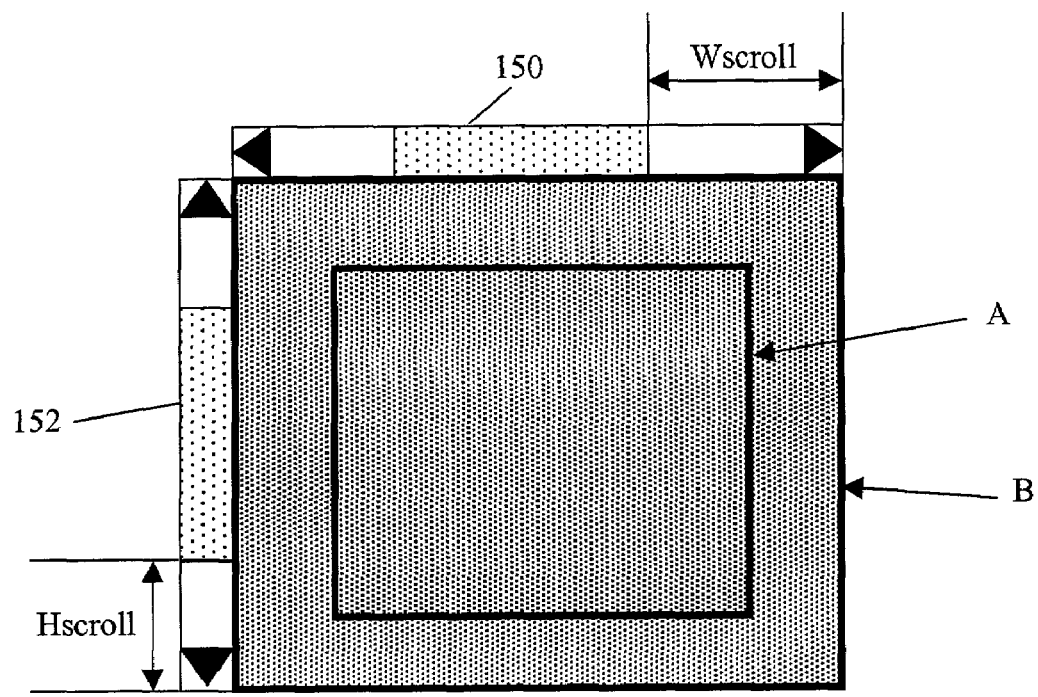
Figure 8B:
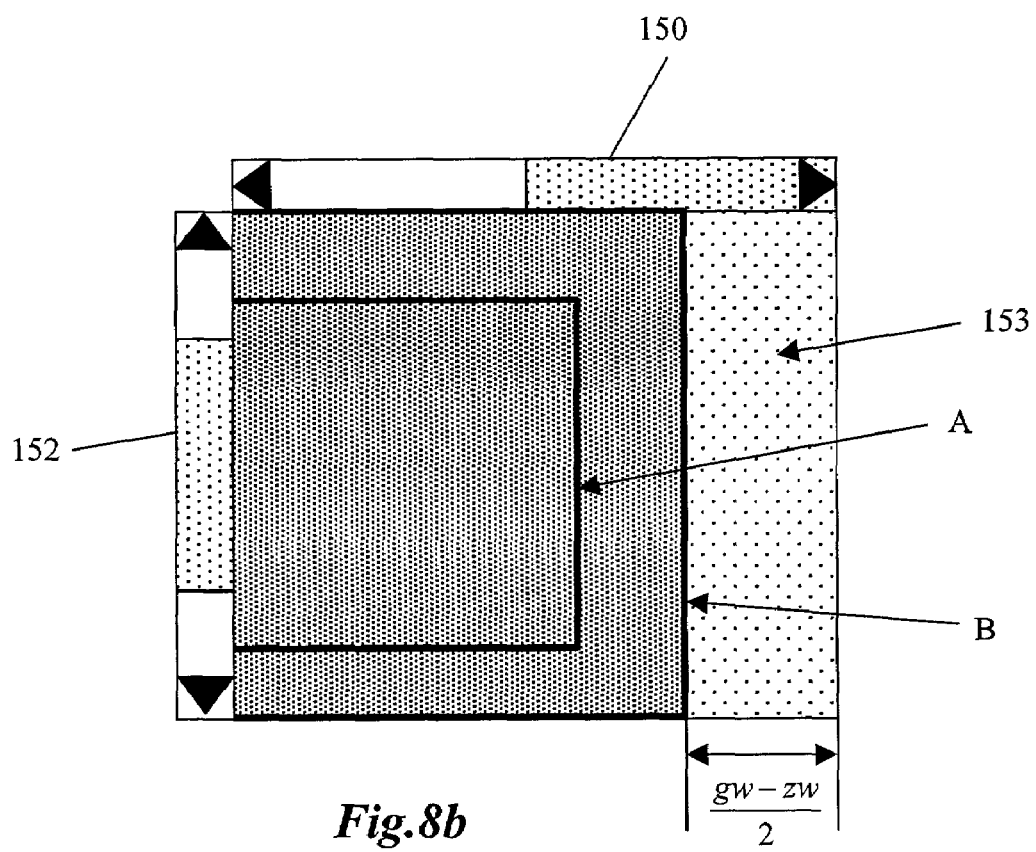
Figure 9:
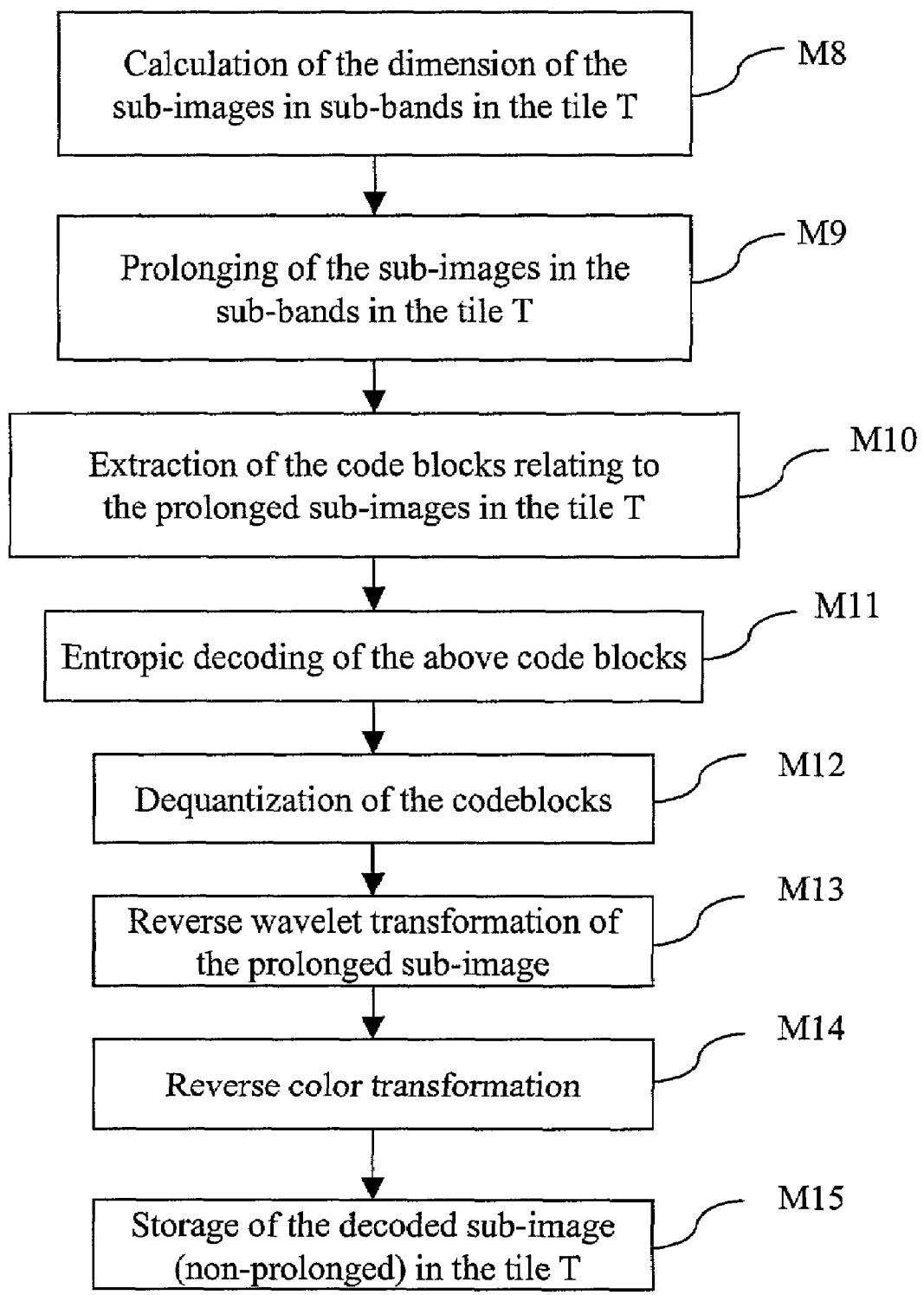
Figure 10:
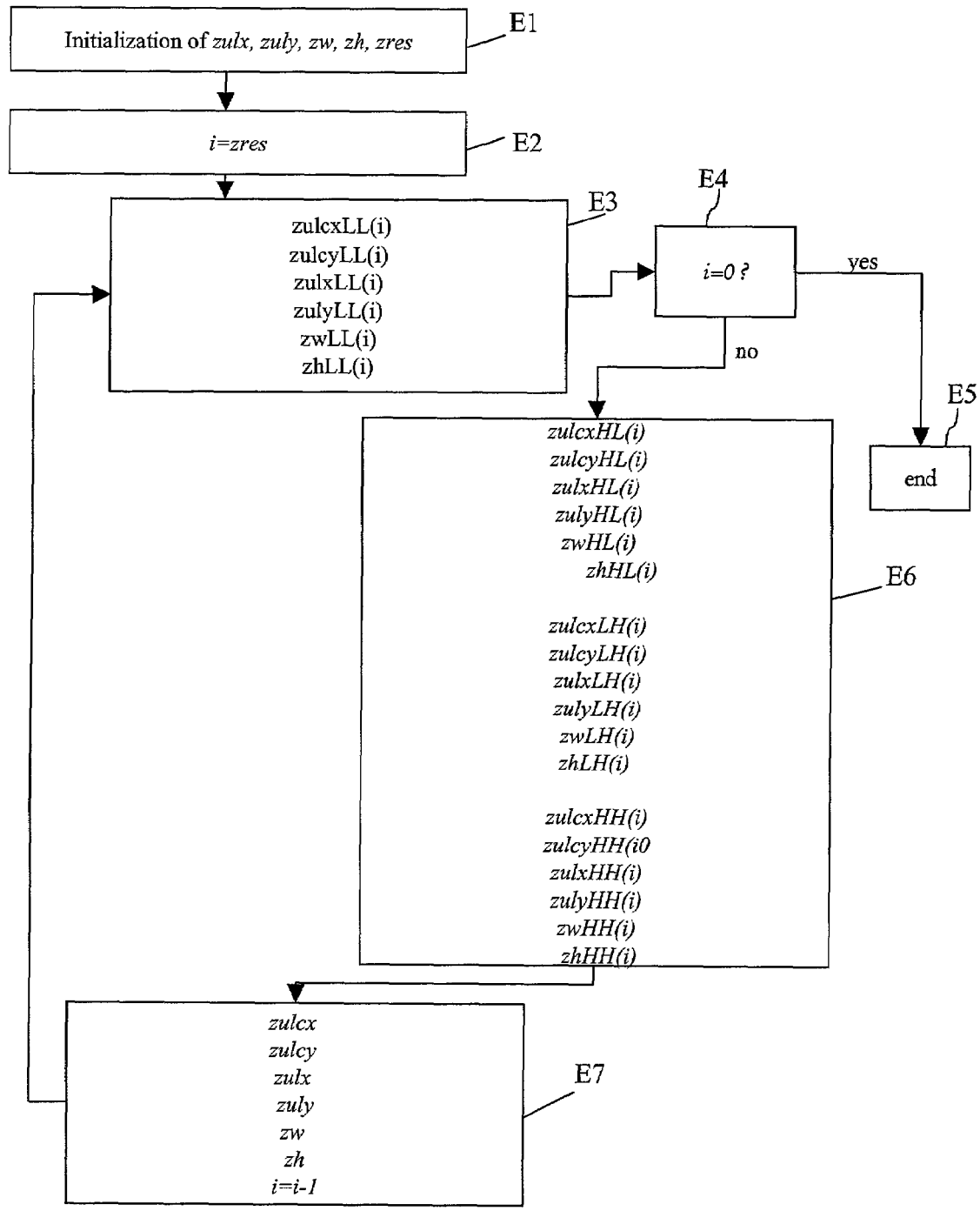
Figure 11:
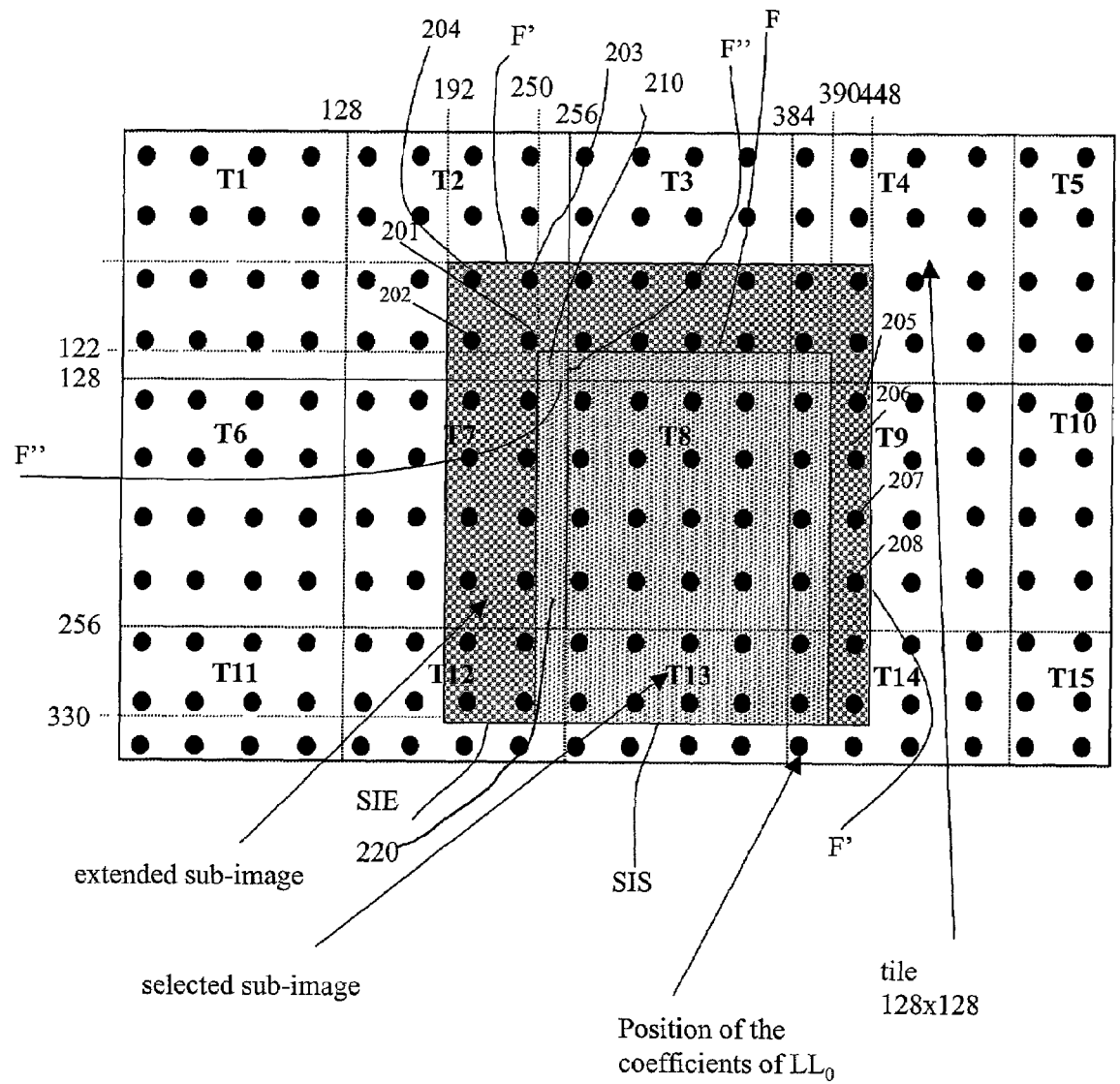
Figure 12:
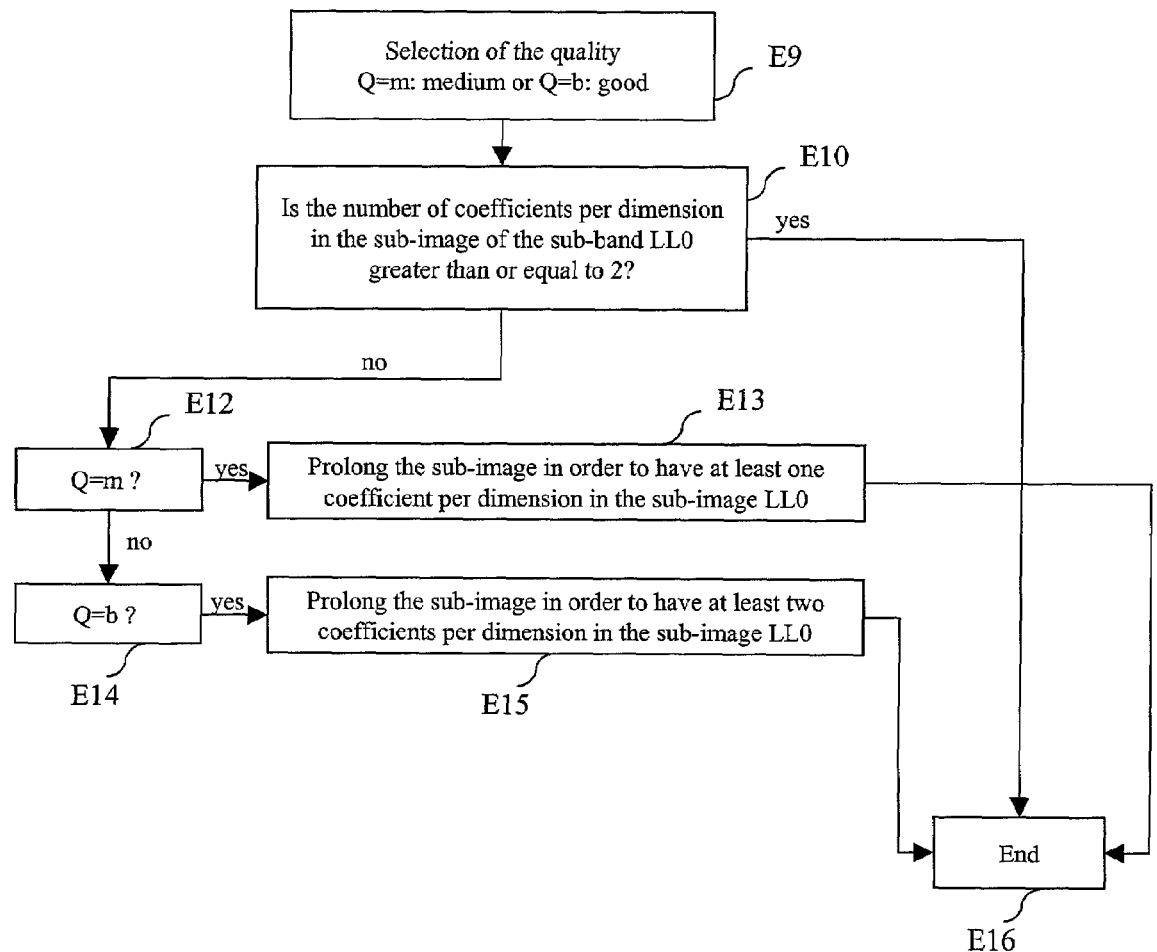
Figure 13:
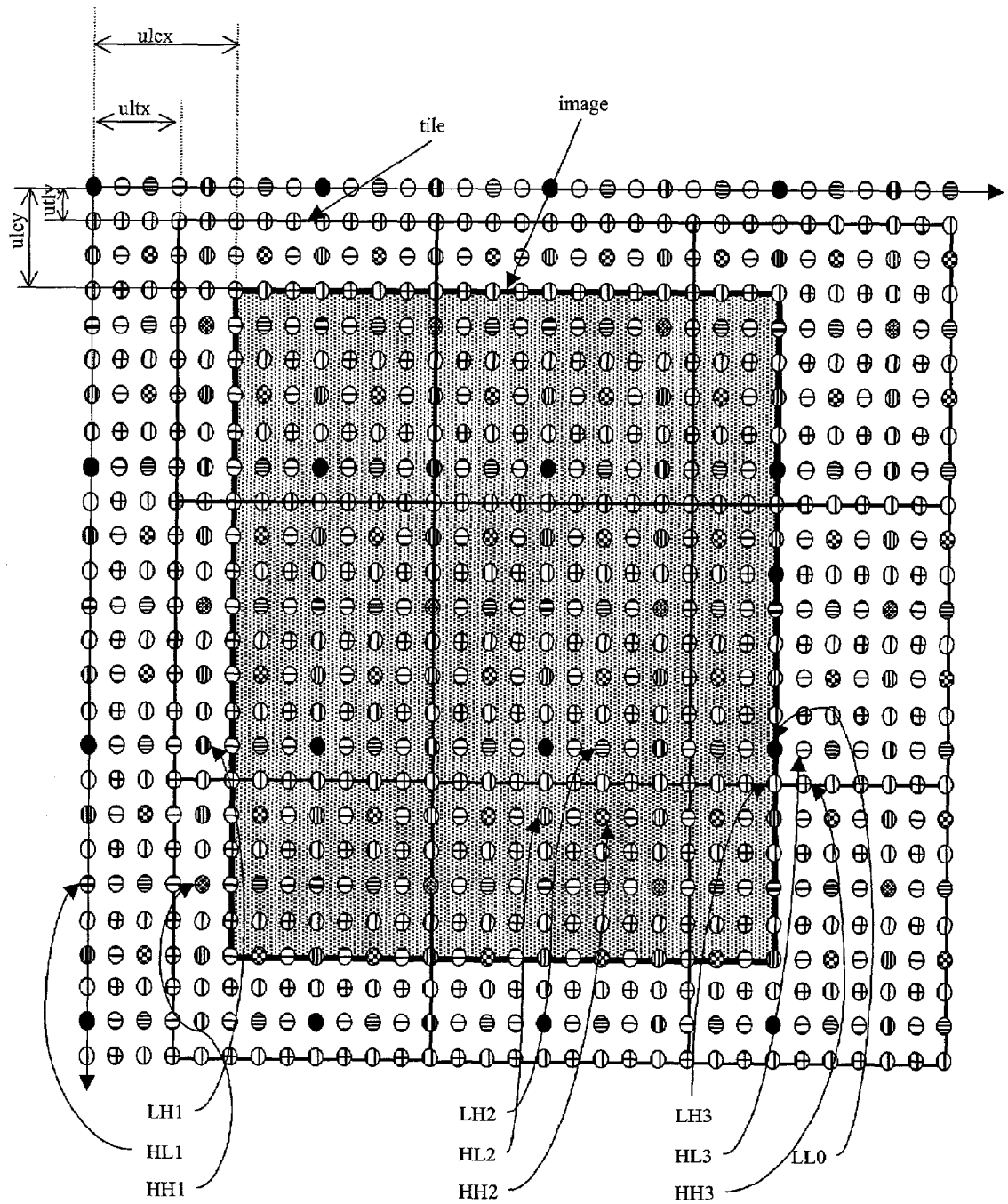

The characteristics and advantages of the present invention will emerge more clearly from a reading of the following description, given solely by way of illustration and made with reference to the accompanying drawings, in which:

FIG. 1 depicts schematically a device for coding a digital signal,

FIG. 2 depicts schematically a device for processing, according to the invention, a coded digital signal, FIG. 3 depicts an embodiment of the processing device of FIG. 2, FIG. 4a depicts an image before coding, FIG. 4b depicts the decomposition into frequency sub-bands of the image of FIG. 4a, FIG. 5 is a processing algorithm according to the present invention, including the decoding of an image, FIG. 6 is a spatial schematic representation of an image fraction separated into tiles and comprising the sub-image selected by the user, FIG. 7 is an algorithm for decoding full tiles used during the execution of the algorithm of FIG. 5, FIG. 8a is a schematic view depicting the display, on the screen of a user, of the selected sub-image and scroll bars, FIG. 8b is a schematic view depicting the display on the screen of a user when the scroll bars displayed in FIG. 8a are selected, FIG. 9 is a partial tile decoding algorithm used during the execution of the algorithm in FIG. 5, FIG. 10 is an algorithm for calculating the size of a sub-image which is used during the execution of step $M_8$ of the algorithm of FIG. 9, FIG. 11 is a spatial representation of an image separated into tiles, of the position of the coefficients of the last-level low sub-band on this image and of a selected sub-image, FIG. 12 is an algorithm for estimating the retrieval quality of a sub-image and for deciding with regard to the modification of the size of this sub-image, used during the execution of step $M_9$ of the algorithm of FIG. 9, FIG. 13 is a spatial representation grid for the different frequency sub-band coefficients.

According to a chosen embodiment depicted in FIG. 1, a data coding device is a device 2 which has an input 24 to which a source 1 of uncoded data is connected.

The source 1 has for example a memory means, such as a random access memory, a hard disk, a diskette or a compact disc, for storing uncoded data, this memory means being associated with an appropriate reading means for reading the data therein. A means for recording the data in the memory means can also be provided.

It will be considered more particularly hereinafter that the data to be coded are a series of original digital samples representing physical quantities and representing, for example, an image IM.

The present invention could be applied to a sound signal in which it is wished to decode an extract of a compressed audio signal. If the original audio signal is partitioned into zones which are each encoded independently, then the response to a request from a user wishing to obtain an extract of the audio signal can be decomposed into two main steps: the first consisting of retrieving the zones entirely contained in the request and the second consisting of retrieving the partial zones after specific processing.

The source 1 supplies a digital image signal IM to the input of the coding circuit 2. The image signal IM is a series of digital words, for example bytes. Each byte value represents a pixel of the image IM, here with 256 levels of gray, or black and white image. The image can be a multispectral image, for example a color image having components in three frequency bands, of the red-green-blue type or luminance and chrominance. Either the color image is processed in its entirety, or each component is processed in a similar manner to the monospectral image.

Means 3 using coded data are connected at the output 25 of the coding device 2.

The user means 3 include for example means of storing coded data, and/or means of transmitting coded data.

The coding device 2 has conventionally, as from the input 24, a transformation circuit 21 which implements decompositions into signals of frequency sub-bands of the data signal, so as to effect an analysis of the signal.

The transformation circuit 21 is connected to a quantization circuit 22. The quantization circuit implements a quantization known per se, for example a scalar quantization, or a vector quantization, of the coefficients, or groups of coefficients, of the frequency sub-band signals supplied by the circuit 21.

The circuit 22 is connected to an entropic coding circuit 23, which effects an entropic coding, for example a Huffman coding, or an arithmetic coding, of the data quantized by the circuit 22.

FIG. 2 depicts a device 5 for decoding data (coded image) according to the invention, the data having been coded by the device 2.

Means 4 using coded data are connected at the input 50 of the decoding device 5. The means 4 include for example coded data memory means, and/or means of receiving coded data which are adapted to receive the coded data transmitted by the transmission means 3.

Means 6 using decoded data (reconstructed image) are connected at the output 51 of the decoding device 5. The user means 6 are for example image display means (a screen), or sound reproduction means, according to the nature of the data processed.

The decoding device 5 overall performs operations which are the reverse of those of the coding device 2 except for the first operations.

The device 5 has a circuit 52 for reading all the information representing the image signal and, more particularly, the original samples and parameters used during the coding. This set of header information of the coded signal is applied to the input 50 of said device.

This circuit 52 makes it possible to read the data concerning the size of the set of original samples (image) constituting the image signal and its resolution, that is to say the number of levels of decomposition into frequency sub-bands of this set.

The image signal also being partitioned into zones called tiles, the coded signal has spatial information representing these tiles and which also constitutes header information of the coded signal.

The circuit 52 also reads this information concerning the tiles, namely their number, their width, their height and their position in the image.

The device 5 also has a circuit 53 for receiving a selection of a subset of original samples (sub-image) forming part of the set of original samples constituting the image signal.

The selection of this original sub-image is characterized by data concerning the required position, size and resolution.

This selection can be effected by means of a graphical interface which will also control, when chosen by the user, the validity of the selected sub-image.

This is because the selected sub-image must be of a size less than or equal to that of the image in the resolution in question.

The user sends for example at a distance a request for obtaining part of the image signal with a view to its retrieval, that is to say more precisely its display.

The device 5, which is for example integrated in a server, receives this request and analyses it.

The device 5 has a circuit 55 for analyzing the request for obtaining part of the coded image signal emanating from the user.

The circuit 55, connected to the circuit 53, locates the selected part of the image signal in said signal using the information supplied by the user and the header information of the image signal.

The device 5 has a circuit 58 which is connected to the circuit 55 and which determines the so-called internal tiles of the image which are entirely contained in the selected sub-image and which will be supplied quickly to the user with a view to their display (first display).

The device 5 also has an entropic decoding circuit 60, which effects an entropic decoding corresponding to the coding of the circuit 23 in FIG. 1. The circuit 60 is connected to a dequantization circuit 61, corresponding to the quantization circuit 22. The circuit 61 is connected to a reverse transformation circuit 62, corresponding to the transformation circuit 21. The transformations envisaged here effect a synthesis of the digital signal, from frequency sub-band signals.

The device 5 has a circuit 59 which is connected to the circuit 55 and which determines the so-called partial tiles of the image which are partially contained in the selected sub-image. More particularly, this circuit determines so-called internal portions of these tiles which are disposed within the selected sub-image, at the periphery of the aforementioned internal tiles, and which will subsequently be supplied to the user with a view to their display (second display), in order to completely respond to the request of this user.

This circuit is connected to a so-called preliminary spatial extension circuit 63 which can proceed or not with an increase in the size or dimension of the partial tile internal portion (extension) according to at least one predetermined criterion which may for example be the memory capacity available to the user.

This increase in size, if it takes place, is effected for the purpose of enabling the user to be able to subsequently display more data than those requested in his initial request, these additional data already having been decoded.

This will thus enable the user not to have to make a second request in order to obtain additional data.

In addition, the additional data would be accessible to him very quickly since they would already be decoded.

The extension circuit 63 is connected to the aforementioned decoding circuit 60 and reverse transformation circuit 62.

It should be noted that the arrows between the blocks represent the data of the coded image which transit between these blocks and related information such as the size of the data to be decoded.

The coding device and/or the decoding device can be integrated in a digital apparatus, such as a computer, a printer, a facsimile machine, a scanner or a digital photographic apparatus, for example.

The coding device and the decoding device can be integrated in one and the same digital appliance, for example a digital photographic apparatus.

With reference to FIG. 3, an example of a programmable device 100 implementing the invention is described. This device is adapted to transform a digital signal, and to synthesize it.

According to the chosen embodiment depicted in FIG. 3, a device implementing the invention is for example a microcomputer 100 connected to different peripherals, for example a digital camera 101 (or a scanner, or any image acquisition or storage means) connected to a graphics card and supplying data to be coded or compressed.

The device 100 has a communication bus 102 to which there are connected:
  a central unit 103 (microprocessor),
  a read only memory 104, containing a program "Progr",
  a random access memory 106, containing registers adapted to record variables modified during the execution of the aforementioned program,
  a screen 108 for displaying the data to be decoded or serving as an interface with the user, who will be able to parameterize certain decoding modes, using a keyboard 110 or any other means, such as for example a mouse, the screen 108 also being able to allow the display of the decoded data which underwent the processing according to the invention,
  a hard disk 112,
  a disk drive 114 adapted to receive a diskette 116,
  an interface 118 for communication with a communication network 120 able to transmit data decoded by the device or to receive data coded by another device,
  an input/output card 122 connected to a microphone 124 (the data to be processed according to the invention then constitute an audio signal).

The communication bus allows communication between the different elements included in the microcomputer 100 or connected to it. The representation of the bus is not limitative and, notably, the central unit is able to communicate instructions to any element of the microcomputer 100 directly or by means of another element of the microcomputer 100.

The program denoted "Progr" enabling the programmable device to implement the invention can be stored for example in read only memory 104 (referred to as ROM in the drawing) as depicted in FIG. 3. According to one variant, the diskette 116, just like the hard disk 112, can contain coded or decoded data as well as the code of the invention which, once read by the device 100, will be stored in the hard disk 112. In a second variant, the program can be received and stored in an identical fashion to that described previously by means of the communication network 120.

The diskettes can be replaced by any information carrier such as, for example, a CD-ROM or a memory card. In general terms, an information storage means, which can be read by a computer or by a microprocessor, integrated or not into the device, possibly removable, stores a program implementing the processing method according to the invention.

In more general terms, the program can be loaded in one of the storage means of the device 100 before being executed.

The central unit 103 will execute the instructions relating to the implementation of the invention, instructions stored in the read only memory 104 or in the other storage elements. On powering up, the processing programs and, more particularly the decoding programs, which are stored in a non-volatile memory, for example the ROM memory 104, are transferred into the random access memory RAM 106, which will then contain the executable code of the invention, as well as registers for storing the variables necessary for implementing the invention.

FIG. 4a depicts schematically a digital image IM at the output of the image source 1 of FIG. 1.

This figure is decomposed by the transformation circuit 21 of FIG. 1, which is a dyadic decomposition circuit with three decomposition levels.

The circuit 21 is, in this embodiment, a conventional set of filters, respectively associated with decimators by two, which filter the image signal in two directions, into sub-band signals of high and low spatial frequencies. The relationship between a high-pass filter and a low-pass filter is often determined by the conditions for perfect reconstruction of the signal. It should be noted that the vertical and horizontal decomposition filters are not necessarily identical, although in practice this is generally the case. The circuit 21 here includes three successive analysis units for decomposing the image IM into sub-band signals according to three decomposition levels.

In general terms, the resolution of a signal is the number of samples per unit length used for representing this signal. In the case of an image signal, the resolution of a sub-band signal is related to the number of samples per unit length used for representing this sub-band signal horizontally and vertically. The resolution depends on the number of decompositions effected, the decimation factor and the resolution of the initial image.

The first analysis unit receives the digital image signal SI and, in a known fashion, delivers as an output four sub-band signals $LL_3$, $LH_3$, $HL_3$ and $HH_3$ with the highest resolution $RES_3$ in the decomposition.

The sub-band signal $LL_3$ includes the components, or samples, of low frequency, in both directions, of the image signal. The sub-band signal $LH_3$ includes the components of low frequency in a first direction and of high frequency in a second direction, of the image signal. The sub-band signal $HL_3$ includes the components of high frequency in the first direction and the components of low frequency in the second direction. Finally, the sub-band signal $HH_3$ includes the components of high frequency in both directions.

Each sub-band signal is a set of real samples (these could also be integers) constructed from the original image, which contains information corresponding to an orientation which is respectively vertical, horizontal and diagonal of the content of the image, in a given frequency band. Each sub-band signal can be assimilated to an image.

The sub-band signal $LL_3$ is analyzed by an analysis unit similar to the previous one in order to supply four sub-band signals $LL_2$, $LH_2$, $HL_2$ and $HH_2$ of resolution level $RES_2$.

Each of the sub-band signals of resolution $RES_2$ also corresponds to an orientation in the image.

The sub-band signal $LL_2$ is analyzed by an analysis unit similar to the previous one in order to supply four sub-band signals $LL_0$ (by convention), $LH_1$, $HL_1$ and $HH_1$ of resolution level $RES_1$. It should be noted that the sub-band $LL_0$ forms by itself the resolution $RES_0$.

Each of the sub-band signals of resolution $RES_1$ also corresponds to an orientation in the image.

FIG. 4b depicts the image IMD resulting from the decomposition of the image IM, by the circuit 21, into ten sub-bands and according to four resolution levels: $RES_0$ ($LL_0$), $RES_1$ ($LL_2$), $RES_2$ ($LL_3$), $RES_3$ (original image). The image IMD contains as much information as the original image IM, but the information is divided frequency-wise according to three decomposition levels.

Naturally, the number of decomposition levels, and consequently of sub-bands, can be chosen differently, for example 16 sub-bands on six resolution levels, for a bidimensional signal such as an image. The number of sub-bands per resolution level can also be different. In addition, the decomposition may not be dyadic. The analysis and synthesis circuits are adapted to the dimension of the signal processed.

In FIG. 4b the samples issuing from the transformation are arranged sub-band by sub-band.

It will be noted that the image IM in FIG. 4a is separated into zones, referred to as tiles, only some of which have been depicted in FIG. 4b in order not to overload the figure. When the image is decomposed by the circuit 21, this image can be decomposed tile by tile.

By collecting together in the same figure the different images resulting from the tile by tile decomposition of the image IM, the result is the image IMD of FIG. 4b, on which tiles appear.

In addition, each tile of the image IMD is partitioned into blocks, some of which are depicted in FIG. 4b.

The circuits 22 and 23 of FIG. 1 apply independently to each block of each tile in question. The image signal coded by the circuit 2 thus conveys blocks of samples obtained by coding of the original samples and which constitute the bit stream.

These blocks of samples are known as "codeblocks" and take the position indicated in FIG. 4b.

The coded image signal also contains header information as indicated above with reference to FIG. 2.

This header information includes notably the information concerning the size of the image, namely its width w and its height h, its position in a reference frame represented by the coordinates ulcx (X-axis) and ulcy (Y-axis), and the number of resolutions res.

Moreover, as the coded image includes tiles, the header information also includes information concerning these tiles, namely their number nbT, their width wT, their height hT and their position represented by the coordinates ultx and ulty.

The header information of the coded signal makes it possible, as soon as received and read, to have information on the coding of the signal.

FIG. 5 is an algorithm containing different instructions or portions of code corresponding to steps of the method of processing the digital image signal coded according to the invention.

More particularly, this algorithm constitutes an algorithm for decoding the signal coded according to the invention.

The computer program denoted "Progr" which is based on this algorithm is stored in the read only memory 104 of FIG. 3, on initialization of the system, and transferred into the random access memory 106. It is then executed by the central unit 103, which thus makes it possible to implement the method according to the invention in the device of FIG. 3.

As depicted in FIG. 5, a first step of the algorithm, denoted S1, consists of reading the aforementioned data represented by the following notations: w, h, ulcx, ulcy, res, wT, hT, ultx, ulty and nbT.

These data are stored in registers of the random access memory 106 of FIG. 3.

During the following step S2, the request is received from a user aimed at obtaining a sub-image selected by the user amongst the image IM in question depicted in FIG. 4a with a view to its retrieval, that is to say its display.

To do this, the user states in his request the size of this sub-image represented by the notations zw (the width of the sub-image) and zh (the height of the sub-image), as well as the coordinates zulx (the X-axis from the top corner of the sub-image) and zuly (the Y-axis from the top left-hand corner of this sub-image) making it possible to locate this sub-image in the image IM in question (FIG. 4a).

The user also specifies the resolution, denoted zres, of the chosen sub-image.

The user can, for example, request a sub-image with a resolution lower than that of the image in question.

Thus, for example, the concern can be solely with the sub-bands $LL_0$, $LH_1$, $HL_1$, $HH_1$, $LL_2$, $LH_2$, $HL_2$ and $HH_2$.

As mentioned above, this step can be performed by means of a graphical interface (FIG. 2).

The data zw, zh, zulx, zuly and zres are also stored in registers of the random access memory 106 of FIG. 3.

The analysis of the request from the user and, notably, the location of the sub-image in the image is effected during a following step S3 using information supplied by the user, namely information on size (zulx, zuly, zh, zw), resolution (zres) and quality (zq) of the sub-image, as well as header information of the coded image signal (information on the size and resolution of the image).

This step S3 is followed by a step S4, during which a position is taken on the first tile $T_1$ of the image in question.

FIG. 6 depicts in gray the sub-image of the image selected by the user, as well as the different tiles of the image which are contained entirely or partially in the sub-image.

This figure also depicts the origin O of a reference frame in which the image and sub-image are positioned.

In this reference frame, the sub-image is marked by the point of coordinates (zulx, zuly), whilst the grid of the aforementioned tiles is marked by the point of coordinates (ultx, ulty).

Step S4 leads to step S5, during which a test is performed to determine whether the tile in question is entirely contained in the selected sub-image.

In the negative, step S5 is followed by a step S6, during which a test is performed in order to determine whether the tile which is not entirely contained in the sub-image selected is the last tile of the image.

In the negative, step S6 is followed by another step S7, during which the tile counter is incremented by one unit.

Step S7 is once again followed by the previously described step S5.

When the test performed at step S5 is positive and therefore the tile in question, referred to as the internal tile, is entirely contained in the selected sub-image, then step S5 is followed by step S8.

During this step, a decoding is carried out of the internal tile which has just been taken into account and the latter is displayed on the screen of the user.

The full tiles to which the analysis loop which has just been described relates are the tiles T1, T2, T3 and T4 depicted in FIG. 6.

As depicted in FIG. 8a, the display of the full tiles T1 to T4 corresponds to a first display which fits within the frame depicted in black in FIG. 8a and marked by the arrow A.

Once completed, step S8 is followed by the previously described step S6, during which a test is carried out in order to determine whether the tile in question is the last tile of the image.

A description will now be given, with reference to the algorithm in FIG. 7, of the decoding of a tile as mentioned succinctly above at step S8.

The algorithm of FIG. 7 includes a first step M1 during which the bit stream representing the current tile in coded form is obtained.

Step M1 is followed by a step M2, during which the header of the file concerning the tile analyzed is read and, notably, the blocks of samples of the coded image digital signal constituting this tile are extracted.

Step M2 is then followed by a step M3, during which an entropic decoding or decompression of the previously extracted blocks is carried out and then, during a step M4, a dequantization of these decoded blocks is carried out.

The following step M5 applies to these blocks thus dequantized a transformation which is the reverse of the decomposition into frequency sub-bands carried out on coding.

It should be noted, for example, that it is a case here of a reverse wavelet transformation.

During the following step M6, a reverse color transformation can possibly be carried out on the tile in question if the color image has, during its coding, undergone a color transformation.

This step is followed by a step M7 of storing the tile thus decoded in a file.

It should be noted that steps M4 to M7 are each known per se to a person skilled in the art. It should be noted that operations M5, M6 and M7 could be combined into a single step.

When the test of step S6 is positive, and therefore when all the internal tiles contained entirely in the selected part of the coded digital image signal have been processed, the following step is passed to, denoted S9, during which once again a position is taken on the first tile of the image.

This step is followed by a step S10, during which a test is performed on the tile in order to determine whether this has already been decoded.

In the affirmative, step S10 is followed by a step S11, during which a test is performed in order to determine whether this is the last tile of the image.

In the negative, step S11 is followed by a step S12, during which the tile counter is incremented, and the previously cited step S10 is then returned to.

When a tile has not yet been decoded, a so-called partial tile is concerned, which is partially contained in the selected part of the coded digital image signal.

Such a tile is for example the one denoted T5 in FIG. 6.

During the following step S25, the portion of the partial tile which is contained within the selected part of the signal (sub-image) is determined.

This portion is referred to as the internal portion and is denoted Pint.

During the processing of a partial tile such as the tile T5 of FIG. 6, step S25 is followed by a step S13, during which a test is carried out in order to decide, according to at least one predetermined criterion, whether an increase in the size (preliminary spatial extension) of the internal portion Pint in question must be taken into account with a view to any subsequent display.

It should be noted that the aforementioned criterion may for example be the memory capacity available to the user or, for example, the possible cost of transmitting additional data or the calculation power of the equipment of the user.

It should also be noted that the spatial extension will be decided in a coherent fashion between the different partial tiles considered in the sub-image selected by the user so that, if a spatial extension is decided for a partial tile, the adjacent partial tile is also spatially extended.

Thus, for example, it will be decided to proceed in a coherent fashion with the spatial extension of the tiles situated on the same side of the sub-image selected, on two or three of the sides of the sub-image, or over the entire periphery thereof according to the cases envisaged.

When it is decided not to proceed with an increase in the size (no preliminary spatial extension) of the internal portion Pint of the tile in question, then step S13 is followed by a step S14 during which the steps of the algorithm depicted in FIG. 9 and which form part of the algorithm of FIG. 5 will be implemented.

During the first step denoted M8 of the algorithm of FIG. 9, the size or dimension of the selected sub-image projected in the different frequency sub-bands is calculated for the tile in question.

This calculation step will be described in more detail subsequently with reference to FIG. 10, in order not to unnecessarily complicate the description of FIG. 9.

During step M9, on the one hand the quality with which the tile in question of the selected sub-image can be retrieved is estimated, to within the decoding errors, and on the other hand a possible intervention is carried out on this retrieval quality (extension of quality) before the decoding of this sub-image.

This step M9 is decomposed according to the different steps depicted on the algorithm in FIG. 12 and which will be described subsequently with reference to FIG. 11 in order, here also, not to unnecessarily complicate the description of FIG. 9.

During step M9, a number of samples of at least one predetermined type which are contained in the internal portion Pint of the partial tile in question are obtained. According to the number of samples obtained, a decision is taken with regard to any modification of the size of the internal portion in question.

More precisely, the number of coefficients per dimension of the image which are contained in the internal portion in question are determined amongst the coefficients of the low-frequency sub-band of the last decomposition level obtained by decomposition into frequency sub-bands of the set of original samples constituting the image signal.

As will be seen subsequently, this analysis can result in increasing the size of the internal portion in question or preserving the size thereof.

At the time of the analysis carried out on the aforementioned number of samples, it should be noted that the decision which will be taken on any modification to this size does not relate to a reduction in the size of the internal portion of the partial tile in question.

In the case of increase in the size of the internal portion in question (extension of quality), there is added to the internal portion Pint of the tile T5 (FIG. 6) a fraction of an external portion of this partial tile and which is situated outside the sub-image selected. In this way a so-called extended internal portion is obtained.

FIG. 6 depicts only the tiles or partial tile portions which the user can display as depicted in FIGS. 8a and 8b.

The current description (step S14 and steps M8 to M15) concerns the case where the user can display only the full tiles and the portions Pint of the partial tiles, as depicted in FIG. 8a.

The added fraction of the external portion of the partial tile T5 is therefore not shown in this figure.

The extension of the internal portions of the partial tiles and their representation will be dealt with subsequently in FIGS. 11 and 12, in order not to unnecessarily complicate the present description.

For the relevant tile T5, all the extended portion will thus be decoded, as explained during the following steps M10 to M15, in order to improve the quality of retrieval of the internal portion Pint of the sub-image requested by the user.

However, as indicated above, only the internal portion Pint of this partial tile will be displayed on the screen (FIG. 8a).

Step M9 leads to a step M10, during which an extraction of the samples is carried out and more particularly of the blocks of samples of the digital coded image signal which correspond to the extension of the sub-image in the partial tile in question.

Step M10 is then followed by a step M11 during which an entropic decoding or decompression of the previously extracted blocks is carried out and then, during a step M12, a dequantization of these decoded blocks.

The following step M13 applies to these blocks thus dequantized a transformation which is the reverse of the decomposition into frequency sub-bands which was carried out on coding.

It should be noted, for example, that it is a case here of a reverse wavelet transformation.

At the end of step M13, an extended portion of the sub-image of the coded image in the partial tile in question is retrieved and, during step M14, a reverse color transformation may if necessary be implemented on the retrieved portion if the color image has, during its coding, undergone a color transformation.

This step is followed by a storage step M15 which consists simply of extracting, from the extended portion of the sub-image in the partial tile concerned, the internal portion Pint of this tile forming part of the sub-image which is requested by the user.

This part requested by the user will thus be able to benefit from increased quality because of the extension of quality effected as indicated above and which will be detailed during the description given with reference to FIGS. 11 and 12.

It should be noted that steps M10 to M15 are each known per se to a person skilled in the art. It should be noted that operations M13, M14 and M15 could be combined in a single step.

When the execution of the algorithm of FIG. 9 is complete, step S14 is then followed by step S11, already described, during which it is determined whether the tile which has just been analyzed was the last tile of the image.

In the negative, step S11 is followed by the aforementioned steps S12, S10 and S13.

When the test carried out at step S13 is positive (preliminary spatial extension), having regard to the predetermined criterion which was fixed (memory capacity available to the user), a test is carried out, during the following step S15, according to at least one predetermined criterion, in order to determine the magnitude of the increase in the size of the internal portion Pint of a partial tile.

This criterion can be the same as the one cited with reference to step S13, namely the memory capacity available to the user.

However, this criterion may be different as already mentioned above.

It should also be noted that, when a decision is taken on the magnitude of the spatial extension, the consistency of this extension with that of the adjacent tiles which is situated on the same side of the sub-image, or on two sides thereof which are joined, or even over the entire periphery of the sub-image, is also ensured.

The preliminary spatial extension which is decided in this part of the algorithm is effected with a view to enabling the user to subsequently effect, if he so desires, a display of the portions thus spatially extended and which were not requested in his initial request.

This extension process enables the user to have access to an extended sub-image, contained within the image.

When the extension decided during step S15 corresponds to a total extension, then step S15 is followed by step S16.

As depicted in FIG. 6, the so-called total extension consists of adding to the internal portion Pint the entire external portion of the partial tile in question, so as thus to obtain all the tile T5 in the example in question.

Step S16 is next followed by a step S17 which is identical to the previously described step S8 and during which the different steps M1 to M7 of the algorithm of FIG. 7 are executed.

However, step S17 does not repeat the display step provided for in step S8.

When it is decided, at step S15, not to proceed with a total extension, as described with reference to steps S16 and S17, then step S15 is followed by a so-called non-total preliminary spatial extension step S18.

During this step, as depicted in FIG. 6, the fraction of an external portion Pext of the partial tile in question T5 which is disposed outside the selected sub-image is added, so as thus to obtain a spatially extended portion of a partial tile denoted Pet.

In the case cited, thus only a fraction of the partial tile T5 is taken into account by the extension process.

Step S18 is followed by a step S19 during which a decoding of the spatially extended portion Pet will be carried out using the algorithm of FIG. 9 already described, as well as the algorithms of FIGS. 10 and 12 mentioned above and whose description will be given subsequently.

During this step S19, the number of samples of at least one predetermined type which are contained in the spatially extended portion Pet of the partial tile in question will be analyzed.

According to the number obtained, any modification of the size of this spatially extended portion will be decided on, in order to ensure acceptable quality when this spatially extended portion is displayed.

More precisely, amongst the coefficients of the low-frequency sub-band of the last decomposition level obtained by decomposition into frequency sub-bands of the set of original samples making up the image, the number of these coefficients per dimension of the image which are contained in the spatially extended portion in question will be determined.

It may be considered that the number of coefficients obtained in the spatially extended portion Pet makes it possible to obtain sufficient retrieval quality, therefore not requiring any modification to the size of this spatially extended portion.

In this way, only the spatially extended portion Pet will be taken into account during the decoding of the partial tile in question.

However, it should be noted that the number of samples obtained may prove insufficient compared with the quality required by the user.

Thus it is then necessary to increase the size of the extended portion in order to retrieve an image quality which is acceptable to the user.

Once the increase in the size of the spatially extended portion Pet has been carried out, it is decoded block by block as described with reference to the algorithm of FIG. 9 (steps M10 to M15).

The increase in size of the spatially extended portion Pet was carried out for the purpose of improving the quality of retrieval of this part of the image and only the spatially extended portion Pet will if necessary be displayed if the user so desires.

Step S19, once completed, leads to the step S11 already described.

When the last tile of the image is concerned, step S11 leads to a step S20 during which a second display of the internal portions of the partial tiles surrounding the frame A already displayed (step S8) is carried out.

This second display is depicted in FIG. 8a by the frame indicated by the arrow B.

Thus the sub-image selected by the user is retrieved.

It will be noted that the request of the user has been responded to in two phases, a first one consisting, as described during steps S4 to S8, of processing all the full tiles contained in the selected sub-image and retrieving them rapidly, the second consisting of effecting, after this first retrieval, a processing of the tiles partially contained within this selected sub-image and then proceeding with their retrieval.

Step S20 is next followed by a step S21 during which a test is carried out in order to determine whether a preliminary spatial extension of the internal portions of the different partial tiles has previously been carried out with a view to allowing the subsequent display of the portions thus spatially extended if the user so desires.

Where such an extension has not been effected as described with reference to the aforementioned steps S13 and S14, step S21 is followed by a step S22 ending the processing and decoding algorithm according to the invention.

On the other hand, when the test of step S21 is positive, during step S23, the spatially extended and decoded portions (steps S15 to S19) are stored, with a view to permitting their subsequent display.

During this step, only the spatially extended and decoded portions are stored, as described with reference to steps S17 and S19.

This is because, even if these spatially extended portions have been the subject of an increase in size (step S17), the latter is not stored here.

Step S23 is followed by a step S24 during which there is displayed on the screen depicted in FIG. 8a at least one interactive mechanism taking the form of an interactive region and, more particularly, two of these regions which are arranged adjacent to the internal portions of the partial tiles displayed in the frame B.

These interactive regions are in the form of scroll bars which make it possible, when they are activated by the user, for example by means of a cursor moving on the screen, to display all or some of the spatially extended portions stored at step S23.

These interactive regions make it possible, when they are activated by the user, to obtain additional data of the image signal compared with the initially selected sub-image.

The user can thus obtain a sub-image spatially extended within the limits which have been defined previously.

The user can then quickly display the image portions adjacent to the display part (selected sub-image), since these image portions are already stored in memory and their display does not therefore require on the part of the user the intervention of a new request.

As depicted in FIGS. 8a and 8b, a horizontal scroll bar 150 and a vertical scroll bar 152 are arranged on two of the edges of the selected sub-image delimited by the frame B.

As depicted in FIG. 8b, the user can select the horizontal scroll bar 150 towards the right of the sub-image in order to display the portion of the decoded and stored spatially extended sub-image which is situated close to the right-hand part of the selected sub-image (frame B).

The degree of freedom allocated to each of the scroll bars is a function on the one hand of the ratio between the size of the extended and decoded sub-image, and which is defined by the width gw and the height gh (FIG. 6) and, on the other hand, of the size of the selected sub-image which is displayed in the frame B (width zw and height zh).

Thus the user will have the possibility of moving the horizontal scroll bar to the right as shown in FIG. 8b or to the left, over a length Wscroll=$\alpha \times$(gw−zw)/2 where $\alpha$ is a positive constant.

Likewise, the user can move the vertical scroll bar 102 over a length equal to Hscroll=$\beta \times$(gh−zh)/2 where $\beta$ is a positive constant.

FIG. 8b shows that, when the user selects the horizontal scroll bar 150, he can display on the screen the portion of the spatially extended sub-image 153.

In the representation made in this figure, the left-hand part of the sub-image is no longer displayed on the screen.

However, this example of display is only illustrative and the interactive regions represented by the scroll bars 150 and 152 naturally make it possible, whilst displaying the image portions surrounding the selected sub-image (frame B), to preserve the full display of this selected sub-image.

Moreover, it is possible to display all the spatially extended sub-image including the selected sub-image (frame B) by effecting an enlargement or reduction of this extended sub-image.

However, it is also possible, as depicted in FIG. 8b, to display only a portion of the sub-image extended in the direction selected by the user.

It should be noted that an interactive mechanism which is not displayed on the screen (for example keys on a keyboard) can be used in place of interactive regions displayed on the screen.

During the description of FIG. 9, mention was made briefly of the calculation of the size or dimension of the sub-image projected in the different frequency sub-bands for the tile in question. This calculation is carried out during step M8, which will now be described with reference to FIG. 10.

This step is decomposed according to the different steps of the algorithm of FIG. 10 and which form part of the algorithm of FIG. 9.

This algorithm includes a step E1 of initializing the values of the parameters zulx, zuly, zw, zh and zres corresponding to the selected sub-image.

In addition, it should be noted that it is also possible to add the coordinates zulcx (X-axis) and zulcy (Y-axis) corresponding to the coordinates of the image compared with an original reference frame, in the case where these coordinates are not merged with the origin of the reference frame.

For reasons of simplification, the case will be taken where the coordinates zulcx and zulcy are merged with the origin of the reference frame.

Step E1 is followed by a step E2 during which a parameter i is fixed as being equal to the resolution zres required by the user for the selected sub-image.

In the case concerned here, i is equal to 3.

Step E2 is followed by a step E3 during which, during the first iteration, the size of the sub-image in the sub-band LL(3) is calculated.

During this step, zulcxLL(3), zulxLL(3), zulcyLL(3), zulyLL(3), zwLL(3) and zhLL (3) will thus be calculated in the following manner:

zulcxLL(3)=zulcx and zulcyLL(3)=zulcy.

This calculation is simplified, given that the terms zulcx and zulcy are equal to zero.

zulxLL(3)=E((zulx+1)/2)
zulyLL(3)=E((zuly+1)/2)
zwLL(3)=E((zulx+zw+1)/2)−zulxLL(3), where E(a) designates the mathematical function integer part of a
zhLL(3)=E((zuly+zh+1)/2)−zulyLL(3).

The calculations carried out during this step are merely intermediate calculations whose results are stored in registers in the memory 106.

During the following step denoted E4, a test is carried out on the parameter i in order to determine whether it is equal to zero.

In the affirmative, step E4 is followed by a step E5, terminating the algorithm.

In the negative, step E4 is followed by a step E6 during which the size of the sub-image selected in the different frequency sub-bands $HL_3$, $LH_3$ and $HH_3$ is calculated, taking i=3 in the following formulae:

zulxHL(i)=E (zulx/2)
zulyHL(i)=zulyLL(i)
zulcxHL(i)=zulcx+zwLL(i)
zulcyHL(i)=zulcy
zwHL(i)=E((zulx+zw)/2)−zulxHL(i)
zhHL(i)=zhLL(i)
zulxLH(i)=zulxLL(i)
zulyLH(i)=E(zuly/2)
zulcxLH(i)=zulcx
zulcyLH(i)=zulcy+zhLL(i)
zwLH(i)=zwLL(i)
zhLH(i)=E((zuly+zh)/2)−zulyLH(i)
zulxHH(i)=zulxHL(i)
zulyHH(i)=zulyLH(i)
zulcxHH(i)=zulcxHL(i)
zulcyHH(i)=zulcyLH(i)
zwHH(i)=zwHL(i)
zhHH(i)=zhLH(i).

Thus zulcxHL(3), zulxHL(3), zulcyHL(3), zulyHL(3), zwHL(3) and zhHL(3) are calculated, and then zulcxLH(3), zulxLH(3), zulcyLH(3), zulyLH(3), zwLH(3) and zhLH(3).

Next, the size of the sub-image in the sub-band $HH_3$ is calculated, which supplies the elements zulcxHH(3), zulxHH(3), zulcyHH(3), zulyHH(3), zwHH(3) and zhHH(3).

The different elements which have just been calculated during step E6 are transferred to the corresponding sub-bands $HL_3$, $LH_3$ and $HH_3$. These elements are also stored in registers in the random access memory 106 in FIG. 3.

The following step denoted E7 consists of updating the different elements calculated for the low sub-band $LL_3$ with a view to its further decomposition.

The updating takes place by means of the following equalities:

zulx =zulxLL(i)
zuly =zulyLL(i)
zulcx =zulcxLL(i)
zulcy =zulcyLL(i)
zw=zwLL(i)
zh=zhLL(i).

During the description of FIG. 5 et seq, and more particularly describing the step of FIG. 9, reference is made to an algorithm for estimating the quality of retrieval of a sub-image and for deciding with regard to the modification of the size of this sub-image. This algorithm will now be described in more detail with the help of FIG. 11, which depicts the spatial position of the different coefficients of the low-frequency sub-band of the last resolution level, denoted $LL_0$.

The space in question in FIG. 11 is a space of dimensions corresponding to the dimensions of the digital image signal, namely a space of dimension 2.

In this space, the arrangement of the various tiles T1 to T15 constituting the image and which have no link with the tiles T1 to T5 depicted in FIG. 6 has also been shown.

Each black dot represents a coefficient of the low sub-band $LL_0$.

The different figures shown on the X-axis and on the Y-axis indicate the coordinates of the tiles in question as well as the coordinates of the different particular regions considered in this representation.

Thus a first region has been depicted, corresponding to the selected and located sub-image which is indicated by the reference denoted SIS.

This region is delimited from the rest of the image by a line representing a boundary denoted F.

This representation is particularly advantageous since, as will be seen later, it makes it possible to estimate quickly and graphically the quality of retrieval of the selected sub-image and to quickly arrive at a decision with regard to any modification to the size of this sub-image according to the aforementioned estimation of quality.

It would also be equivalent to the representation of FIG. 11 to project the selected and located sub-image SIS in the low sub-band of the last level $LL_0$ (FIG. 4b) and to determine in this sub-image the number of coefficients of this low sub-band in this FIG. 4b. It should be noted that the sub-image and the tiles of FIG. 11 do not correspond to those of FIG. 6. This however changes nothing in the analysis principle which will now be described with reference to FIG. 12.

Step M9 of the algorithm of FIG. 9 succinctly described above is decomposed according to the different steps of the algorithm of FIG. 12, which also form part of the algorithm of FIG. 9.

The processing which will be carried out with reference to the algorithm of FIG. 12 is the one dealt with with regard to the increase in size of the internal portions Pint of the different partial tiles of FIG. 6, such as the one of the tile T5 (step S19, FIG. 5).

This processing also applies to the improvement in the retrieval of the internal portions of the partial tiles referred to in step S14 of FIG. 5.

During the execution of the algorithm depicted in FIG. 12, either the size of the selected and located sub-image will be increased, or the size of this sub-image will be preserved according to the results of a search step carried out at step E10 and the taking account of the criteria selected during step E9.

The algorithm of FIG. 12 begins with a step E9 which makes it possible to set up a predetermined criterion representing a level of quality required for the retrieval of the sub-image.

For example, two quality levels are adopted, a medium level denoted m and a good level, representing a good quality and which is denoted b.

It should be noted that more than two levels can be taken into consideration such as, for example, a low quality, an acceptable quality and finally a quality corresponding to that of the image which is decoded in full.

However, in this example only the aforementioned two quality levels will be adopted and, for example, for tile T2 (FIG. 11), a good quality b will be selected.

In implementing step E9 a predetermined criterion representing a compromise between the required quality and the calculation time or the data processing speed are in some way taken into account.

It should be noted that this way of proceeding is not obligatory.

This is because the user may, on the other hand, favor the quality criterion independently of the calculation time and therefore the data processing speed.

During the following step denoted E10, first of all the number of coefficients of the low sub-band of the last level $LL_0$ per dimension of the image and which correspond to the selected and located sub-image SIS are determined, which can be done with the help of the representation in FIG. 11.

To do this, on the practical level, the number of coefficients of the low sub-band within the region delimited by the boundary F are sought.

A test is then carried out which consists of determining whether the number of coefficients identified is greater than or equal to 2.

Given that the image is considered tile by tile, when the number of coefficients, for example of tile T2 corresponding to the sub-image SIS, is determined, it is perceived that there are none of them.

Step E10 is therefore followed by a step E12 during which a test is carried out in order to determine whether the selected quality corresponds to the medium quality (Q=m).

In the affirmative, step E12 is followed by a step E13 during which it is decided to extend the selected and located sub-image SIS of FIG. 11 in order to have available at least one coefficient of the low sub-band $LL_0$, per dimension, in the part of the sub-image which overlaps the tile T2.

However, in the case concerned here, the chosen quality is the quality b and the test performed at step E12 therefore leads to step E14, during which a test is performed in order to determine whether the chosen quality is the quality b.

Next the following step E15 is passed to.

Having regard to the result of the determination of coefficients carried out at step E10, it is decided, during step E15, to increase the size of the sub-image (extension of quality) in order to add to this at least two coefficients of the low sub-band $LL_0$ per dimension, in the part of the sub-image which overlaps tile T2.

Thus two coefficients are added in the horizontal direction and in the vertical direction in the tile T2, which amounts to moving the boundary F delimiting the sub-image SIS as indicated in FIG. 11.

The coefficients which have been added are indicated by the references 201, 202, 203 and 204 in this figure.

According to the invention, it is thus proposed to choose in an appropriate manner additional coefficients of the low sub-band of the last level to be added to the sub-image in order to improve the quality of retrieval of the latter.

These coefficients to be added are located on each side of the sub-image projected in the low sub-band.

This is because, in the aforementioned example, since the part of the selected and located sub-image SIS which overlaps with the tile T2 does not contain any coefficient of the low sub-band $LL_0$, the retrieval of this part of the sub-image would have resulted in poor quality.

As soon as the decision to modify the size of the sub-image has been taken and the modification has taken place, step E15 is followed by a step E16 terminating the algorithm in FIG. 12.

It will be noted from a reading of FIG. 11 that an identical procedure is followed for tiles T3, T4, T7 and T12.

The processing of tiles T9 and T14 according to the invention will now be dealt with during the execution of the algorithm of FIG. 12.

For example, quality b is selected at step E9.

The search step carried out at step E10 reveals the presence of one coefficient of the low sub-band $LL_0$ per dimension in the part of the selected and located sub-image SIS which overlaps with the tile T9.

Because of this, the result of the test is negative and steps E12 and E13 are executed.

During this last step, having regard to the criterion of good quality selected, the size of the relevant portion of the sub-image is increased by adding one coefficient per horizontal dimension and four coefficients per vertical dimension in order to cover all the tile T9.

These coefficients were situated, before movement of the boundary F, in the immediate vicinity thereof and are now situated within the boundary F'.

The added coefficients are indicated by the references 205, 206, 207 and 208.

A description will now be given of the processing of the tile T8 or T13 according to the algorithm in FIG. 12.

By choosing a good quality during the execution of step E9, step E10 is arrived at, during which the search for coefficients reveals more than two coefficients per dimension, for example, for the tile T8.

In this case, it is decided to preserve the size of this sub-image, having regard to the required quality and the result obtained at step E10 and the latter is next followed by step E16 terminating the execution of the algorithm of FIG. 12.

When the sub-image selected by the user and located in the image has been extended in order to retrieve a good quality, then the extended sub-image SIE is arrived at, which is depicted in FIG. 11 and which encompasses the sub-image SIS.

As described with reference to FIG. 5, the quality extension process which has just been described above is the one which was applied respectively to the internal portions Pint (step S14) and to the spatially extended portions Pet (step S19) of the partial tiles of FIG. 6 and thus makes it possible to retrieve these internal portions with better quality than that obtained if no extension had been effected.

For all the tiles of the image in question, preferably the same quality mode will be selected in order to avoid irregularities in retrieval (quality and size) from one tile to another.

FIG. 13 gives a representation of the different frequency sub-band coefficients in the spatial domain of the original image.

This figure depicts the image delimited by a black border as well as the position of the tiles with respect to this image.

This figure indicates the position of the different frequency sub-band coefficients for each sub-band for the case of a wavelet decomposition effected according to three decomposition levels.

All these coefficients are represented by circles within which there is situated a different pattern according to whether the coefficient belongs to a particular sub-band.

This grid of points is periodic and an identical mesh is found every 8×8 points.

By definition, the grid of coefficients is positioned at the origin of the reference frame of this figure, where the first coefficient of the low sub-band is represented by a black circle which corresponds to the point of origin (0,0).

It should be noted that in JPEG 2000 it will be possible both to position the image in this reference frame by specifying the point defined by the coordinates (ulcx, ulcy) and to position the grid of tiles on this image by the point of coordinates (ultx, ulty).

It should be noted that FIG. 11 represents a particular case where the grid of tiles and the image are both placed at (0,0).

Since these positions change the location of the different elements (tile and position of the coefficients of the sub-bands), it is necessary to take into account these different parameters for calculating the size and for the location of the sub-images in the sub-bands.

According to a variant, it may be advantageous to improve the quality of the image selected on contours thereof.

To do this, the concern is with the projection of the selected sub-image in one or more other frequency sub-bands and one or more other coefficients of this or these other frequency sub-bands are added in the selected sub-image.

The coefficients of a frequency sub-band other than the low sub-band $LL_0$ correspond to a predetermined type different from the type of the coefficients of $LL_0$.

Thus, in projection in this other or in these other frequency sub-bands, the size of the sub-image thus projected is increased by seeking one or more coefficients of sub-bands situated in the immediate vicinity of the boundary of the sub-image before the movement thereof.

It is thus possible to find the extended sub-images in all the frequency sub-bands in order to benefit not only from the coefficients added to the low sub-band of the last level $LL_0$ which afford a significant gain in quality, but also the additional details supplied by the sub-bands LH, HL and HH of the different levels.

It should be noted that it may be advantageous to extend the sub-image in spite of everything even if it already includes two low sub-band coefficients of the last level per dimension in order to improve the quality of the sub-image at the edges.

For example, consider a sub-image included entirely in the tile T8 (FIG. 11) and already containing more than two coefficients $LL_0$ per dimension. To improve the quality at the edges one or two additional coefficients $LL_0$ are added at the edges.

The invention makes it possible to be able to decode a sub-image whilst optimizing the number of coefficients to be decoded.

It also possible to control the criterion representing the compromise between speed of processing and quality of retrieval of the sub-image by modifying the length of the relevant extension of each sub-band of the sub-image in question.

The invention claimed is:

1. A method of processing a coded digital signal from a digital signal separated into several zones, the coded digital signal containing a set of information representing the digital signal, the zones of the signal, and parameters used during the coding, said method including, after reception of a request for obtaining a selected part of the coded digital signal, the following steps:

locating the selected part in the digital signal from the set of information;

determining internal zones contained entirely in the selected part of the digital signal from the set of information;

decoding the internal zones; and retrieving the zones, wherein said method further comprises a step of determining partial zones of the signal which are partially contained in the selected part of the signal and determining internal portions of these zones which are disposed inside the selected part of the signal.

2. A method according to claim 1, wherein the coded digital signal includes (1) a set of information representing the digital signal, zones of the signal representing spatial information, and parameters used during the coding, and (2) the coded zones of the signal, said step of determining the internal zones applies to the zones representing spatial information, and said decoding step applies to the coded zones of the signal.

3. A method according to claim 1, further comprising a step of deciding, according to at least one predetermined criterion, with regard to an increase in the size of each internal portion of a partial zone to be taken into account with a view to any subsequent retrieval, the increase in size being referred to as a preliminary spatial extension.

4. A method according to claim 3, wherein, in the case of a preliminary spatial extension decision leading to a spatially extended portion, said method further comprises a step of deciding, according to at least one predetermined criterion, with regard to the magnitude of the preliminary spatial extension of the internal portion of a partial zone to be taken into account with a view to any subsequent retrieval.

5. A method according to claim 4, wherein the preliminary spatial extension of the internal portions of the partial zones consists of adding to all the external portions of the partial zones which are disposed outside the selected part of the signal, so as to take into account all the partial zones.

6. A method according to claim 4, wherein the preliminary spatial extension of the internal portions of the partial zones consists of adding to these a fraction of the external portions of the partial zones which are disposed outside the selected part of the signal, so as to obtain spatially extended portions of partial zones.

7. A method according to claim 5, wherein the coded digital signal includes a set of samples of different types obtained by coding a set of original samples representing physical quantities, and said method further comprises the following steps:

obtaining a number of samples of at least one predetermined type which are contained in each spatially extended portion of a partial zone, and deciding with regard to a modification of the size of the spatially extended portion in question according to the number of samples obtained.

8. A method according to claim 7, wherein said obtaining step comprises determining, among the coefficients of the low-frequency sub-band of the last decomposition level obtained by decomposition into frequency sub-bands of the set of original samples, the number of coefficients per dimension of the signal which are contained in each spatially extended portion of a partial zone.

9. A method according to claim 8, further comprising a step of increasing the size of the spatially extended portion, leading to a spatially extended and prolonged portion.

10. A method according to claim 4, further comprising a step of decoding spatially extended portions having or not a modified size.

11. A method according to claim 10, further comprising a step of storing the spatially extended portions having or not a modified size and decoded.

12. A method according to claim 4, further comprising a step of retrieving the internal portions of the partial zones adjacent to the internal zones already retrieved.

13. A method according to claim 12, further comprising a step of providing at least one interactive mechanism which makes it possible, when it is activated, to retrieve all or some of the spatially extended portions.

14. A method according to claim 3, wherein, in the case of a decision against preliminary spatial extension, the coded digital signal includes a set of samples of different types obtained by coding a set of original samples representing physical quantities, and said method includes the following steps:

obtaining a number of samples of at least one predetermined type which are contained in each internal portion of a partial zone, and deciding with regard to a modification of the size of the internal portion in question according to the number of samples obtained.

15. A method according to claim 14, wherein said obtaining step comprises determining, among the coefficients of the low-frequency sub-band of the last decomposition level obtained by decomposition into frequency sub-bands of the set of original samples, the number of coefficients per dimension of the signal which are contained in each internal portion of a partial zone.

16. A method according to claim 14, further comprising a step of increasing the size of the internal portion consisting of adding thereto a fraction of an external portion of the partial zone in question and which is disposed outside the selected part of the signal, resulting in a prolonged internal portion of a partial zone.

17. A method according to claim 14, further comprising the following steps:

decoding the internal portions, prolonged or not, and retrieving only the internal portions.

18. A method according to claim 1, wherein the separation zones of the digital signal have each undergone independently a decomposition into frequency sub-bands according to at least one decomposition level.

19. A method according to claim 1, wherein the digital signal is an image signal.

20. A device for processing a coded digital signal from a digital signal separated into several zones, the digital signal containing a set of information representing the digital signal, the zones of the signal, and parameters used during the coding, said device comprising:

means of receiving a request for obtaining a selected part of the coded digital signal;

means of locating the selected part in the digital signal from the set of information;

means of determining internal zones contained entirely in the selected part of the digital signal from the set of information;

means of decoding the internal zones; and means of retrieving the zones, wherein said device further comprises means of determining partial zones of the signal which are partially contained in the selected part of the signal and determining internal portions of these zones which are disposed inside the selected part of the signal.

21. A device according to claim 20, wherein the coded digital signal includes (1) a set of information representing the digital signal, zones of the signal representing spatial information, and parameters used during the coding, and (2) the coded zones of the signal, said means of determining the internal zones apply to the zones representing spatial information, and said decoding means apply to the coded zones of the signal.

22. A device according to claim 20, further comprising means of deciding, according to at least one predetermined criterion, with regard to an increase in the size of each internal portion of a partial zone to be taken into account with a view to any subsequent retrieval, the increase in size being referred to as a preliminary spatial extension.

23. A device according to claim 22, wherein, in the case of a preliminary spatial extension decision leading to a spatially extended portion, said device has means of deciding, according to at least one predetermined criterion, with regard to the magnitude of the preliminary spatial extension of the internal portion of a partial zone to be taken into account with a view to any subsequent retrieval.

24. A device according to claim 23, further comprising means for the preliminary spatial extension of the internal portions of the partial zones which add to all the external portions of the partial zones which are disposed outside the selected part of the signal, so as to take into account all these partial zones.

25. A device according to claim 23, further comprising means for the preliminary spatial extension of the internal portions of the partial zones which add to these a fraction of the external portions of the partial zones which are disposed outside the selected part of the signal, so as to obtain spatially extended portions of partial zones.

26. A device according to claim 24, wherein the coded digital signal includes a set of samples of different types obtained by coding a set of original samples representing physical quantities, said device comprising:

means of obtaining a number of samples of at least one predetermined type which are contained in each spatially extended portion of a partial zone, and means of deciding with regard to a modification of the size of the spatially extended portion in question according to the number of samples obtained.

27. A device according to claim 26, wherein the obtaining means determine, among the coefficients of the low-frequency sub-band of the last decomposition level obtained by decomposition into frequency sub-bands of the set of original samples, the number of coefficients per dimension of the signal which are contained in each spatially extended portion of a partial zone.

28. A device according to claim 27, further comprising means of increasing the size of the spatially extended portion, resulting in a spatially extended and prolonged portion.

29. A device according to claim 23, further comprising means of decoding the spatially extended portions having or not a modified size.

30. A device according to claim 29, further comprising means of storing the spatially extended portions having or not a modified size and decoded.

31. A device according to claim 23, further comprising means of retrieving the internal portions of the partial zones adjacent to the internal zones already retrieved.

32. A device according to claim 31, further comprising means of providing at least one interactive mechanism which makes it possible, when it is activated, to retrieve all or some of the spatially extended portions.

33. A device according to claim 22, wherein, in the case of deciding against preliminary spatial extension, the coded digital signal includes a set of samples of different types obtained by coding a set of original samples representing physical quantities, and said device comprises:

means of obtaining a number of samples of at least one predetermined type which are contained in each internal portion of a partial zone, and means of deciding with regard to a modification of the size of the internal portion in question according to the number of samples obtained.

34. A device according to claim 33, wherein said obtaining means determine, among the coefficients of the low-frequency sub-band of the last decomposition level obtained by decomposition into frequency sub-bands of the set of original samples, the number of coefficients per dimension of the signal which are contained in each internal portion of a partial zone.

35. A device according to claim 33, further comprising means of increasing the size of the internal portion which add thereto a fraction of an external portion of the partial zone in question and which is disposed outside the selected part of the signal, resulting in a prolonged internal portion of a partial zone.

36. A device according to claim 34, further comprising:

means of decoding the internal portions, prolonged or not, and means of retrieving only the internal portions.

37. A device according to claim 20, wherein the separation zones of the digital signal have each undergone independently a decomposition into frequency sub-bands according to at least one decomposition level.

38. A device according to claim 20, adapted to process a digital signal which is an image signal.

39. A device according to claim 20, wherein said means of locating, determining internal zones, decoding, and retrieving are incorporated in:

a microprocessor, a read only memory containing a program for processing the coded digital signal, and a random access memory containing registers adapted to record variables modified during the execution of said program.

40. A computer program stored in a computer readable medium, containing instructions or portions of code for implementing the steps of the processing method according to claim 1, when said computer program is executed on a computer.

* * * * *